(12) United States Patent
Detrick

(10) Patent No.: US 11,572,042 B2
(45) Date of Patent: Feb. 7, 2023

(54) METHOD AND SYSTEM FOR WASHING A VEHICLE

(71) Applicant: Innovative Control Systems, Inc., Wind Gap, PA (US)

(72) Inventor: Kevin Detrick, Nazareth, PA (US)

(73) Assignee: INNOVATIVE CONTROL SYSTEMS, INC., Wind Gap, PA (US)

( * ) Notice: Subject to any disclaimer, the term of this patent is extended or adjusted under 35 U.S.C. 154(b) by 0 days.

(21) Appl. No.: 17/511,034

(22) Filed: Oct. 26, 2021

(65) Prior Publication Data
US 2022/0185242 A1 Jun. 16, 2022

Related U.S. Application Data

(63) Continuation of application No. 15/942,979, filed on Apr. 2, 2018, now Pat. No. 11,155,245.

(60) Provisional application No. 62/480,057, filed on Mar. 31, 2017.

(51) Int. Cl.
| | | |
|---|---|---|
| *B60S 3/06* | (2006.01) | |
| *B08B 1/00* | (2006.01) | |
| *B08B 1/04* | (2006.01) | |
| *B60S 3/04* | (2006.01) | |
| *B60S 3/00* | (2006.01) | |

(52) U.S. Cl.
CPC ............... *B60S 3/06* (2013.01); *B08B 1/002* (2013.01); *B08B 1/04* (2013.01); *B60S 3/04* (2013.01); *B60S 3/002* (2013.01); *B60S 3/004* (2013.01)

(58) Field of Classification Search
None
See application file for complete search history.

(56) References Cited

U.S. PATENT DOCUMENTS

2013/0239992 A1    9/2013   Detrick

FOREIGN PATENT DOCUMENTS

| GB | 1287004 A | 8/1972 |
|---|---|---|
| JP | 2012096730 A | 5/2012 |

*Primary Examiner* — Natasha N Campbell
(74) *Attorney, Agent, or Firm* — Troutman Pepper Hamilton Sanders LLP

(57) ABSTRACT

A wash equipment assembly for a car wash and method of operating the equipment are described. For example, the assembly includes a cleaning element configured to clean a vehicle, an arm assembly operably attached to the cleaning element and configured to move the cleaning element to a vehicle cleaning position, the arm movably fixed to a support at a first end and the cleaning element mounted on the arm at a second end, a controlled locator for positioning the arm relative to the support such that the cleaning equipment is moved to the vehicle cleaning position, and a sensor for evaluating an actual orientation of the cleaning element relative to a default orientation of the cleaning element. In certain implementations, the controlled locator can modify the position of the arm in response to a signal from the sensor, thereby providing a closed loop control system.

15 Claims, 16 Drawing Sheets

METHOD AND SYSTEM FOR WASHING A VEHICLE

CROSS-REFERENCE TO RELATED APPLICATION

This application is a continuation of U.S. patent application Ser. No. 15/942,979 filed Apr. 2, 2018 entitled "Method and System for Washing a Vehicle" now U.S. Pat. No. 11,155,245, which claims the benefit of priority to U.S. Provisional Application No. 62/480,057, titled "Method and System for Washing a Vehicle," filed Mar. 31, 2017, which is incorporated herein by reference in its entirety.

BACKGROUND

The present disclosure generally relates to methods and systems for washing a vehicle.

In most existing vehicle wash systems (e.g., car washes), control signals are sent to wash equipment elements (e.g., soap sprayers, brushes, dryers) for controlling the elements while washing a vehicle. Simple measurements may be determined that govern the control signals, such as the velocity the vehicle is traveling through the wash equipment elements. However, as differently sized vehicles pass through the wash system, the effectiveness of the wash may very depending on the size and shape of the vehicle. Large trucks may have the brushes pressed directly against the sides and roof of the truck, potentially damaging the vehicle or scratching the paint. Similarly, for small, compact cars, the wash equipment may be positioned too far from the sides and roof to effectively clean the car.

Another approach is to store various profiles of a number of vehicles in a database and load a profile specifically for each vehicle entering the wash system. This is time and labor intensive as an operator must identify each vehicle and select the profile from the database. Additionally, the profiles may not account for model changes from year to year and/or any after market alterations to the standard vehicle set-up. For example, if an owner has installed a rear spoiler, or different wheels that alter the height of the vehicle, these changes are not included in the loaded profiles. Again, this can lead to damage or an incomplete wash.

SUMMARY

In one embodiment, there is a method of controlling wash equipment in an automated vehicle wash system having a conveyor, the method comprising: measuring one or more contours of a vehicle as the vehicle moves through an entry area of the automated vehicle wash system on the conveyor; tracking the distance a fixed point relative to the conveyor moves; associating the one or more contours of the vehicle with the position at a fixed point; determining, based on the one or more contours of the vehicle and the position of the fixed point, commands for operating the wash equipment; delivering the commands to the wash equipment; and operating the wash equipment in accordance with the commands.

In one embodiment, the one or more contours of the vehicle are measured by a plurality of sensors. In one embodiment, the plurality of sensors includes six sensors. In one embodiment, the contours of a passenger side and a driver side of the vehicle are each measured using a pair of sensors. In a further embodiment, the method comprises reading data relating to the one or more contours of the vehicle from the plurality of sensors; and streaming the data to at least one processor, the at least one processor controlling the wash equipment elements.

In one embodiment, the plurality of sensors each measure a distance to the vehicle for every predetermined distance the conveyor moves. In a further embodiment, the method comprises measuring one or more operating parameters of the wash equipment. In one embodiment, the one or more operating parameters of the wash equipment is used in determining the commands for operating elements of the wash equipment. In a further embodiment, the method comprises remotely monitoring the one or more operating parameters of the wash equipment. In one embodiment, the wash equipment includes a plurality of elements each configured to wash the vehicle. In one embodiment, the plurality of elements includes a chemical arch and a brush. In one embodiment, measuring one or more contours of the vehicle includes: passing the vehicle through a sensor system, the sensor system including a first sensor set that detects a first distance to a first side of the vehicle, a second sensor set that detects a second distance to a second side of the vehicle, and a third sensor set that detects a third distance to a third side of the vehicle; and receiving a plurality of data readings from each of the first sensor set, the second sensor set, and the third sensor set as the vehicle passes through the sensor system, the plurality of data readings used to define the contour of the vehicle.

In another embodiment, a system comprises a database including a set of computer-readable instructions; a processor in communication with the database; wash equipment configured to wash a vehicle, the wash equipment being coupled with the processor via a communications link; a conveyor configured to transport the vehicle through the wash equipment; a first measuring device configured to collect contour data of the vehicle and store the contour data in the database as the vehicle passes through an entry area; and a second measuring device configured to track a fixed point relative to the conveyor as the vehicle passes through the entry area and the wash equipment, wherein the set of computer-readable instructions are run on the processor and are configured to control the wash equipment based on the contour data of the vehicle and the position of the fixed point.

In one embodiment, the first measuring device includes a plurality of sensors. In one embodiment, the plurality of sensors includes six ultrasonic sensors. In one embodiment, at least two sensors are configured to collect contour data of a passenger side of the vehicle and at least two sensors are configured to collect contour data of a driver side of the vehicle. In one embodiment, the plurality of sensors each measure a distance to the vehicle for every predetermined distance the conveyor moves. In a further embodiment, the system includes a third measuring device configured to measure one or more operating parameters of the wash equipment. In one embodiment, the set of computer-readable instructions are configured to control the wash equipment based on the operating parameters of the wash. In one embodiment, the database is remotely accessible for remotely monitoring the one or more operating parameters of the wash equipment.

In one embodiment, the wash equipment includes a plurality of elements each configured to wash the vehicle. In one embodiment, the plurality of elements includes a chemical arch and a brush. In one embodiment, the first measuring device includes: a first sensor set configured to measure a first distance to a first side of the vehicle; a second sensor set configured to measure a second distance to a second side of the vehicle; and a third sensor set configured to measure a third distance to a third side of the vehicle, wherein the plurality of data readings are used to measure the contour of the vehicle.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

Figure 1:
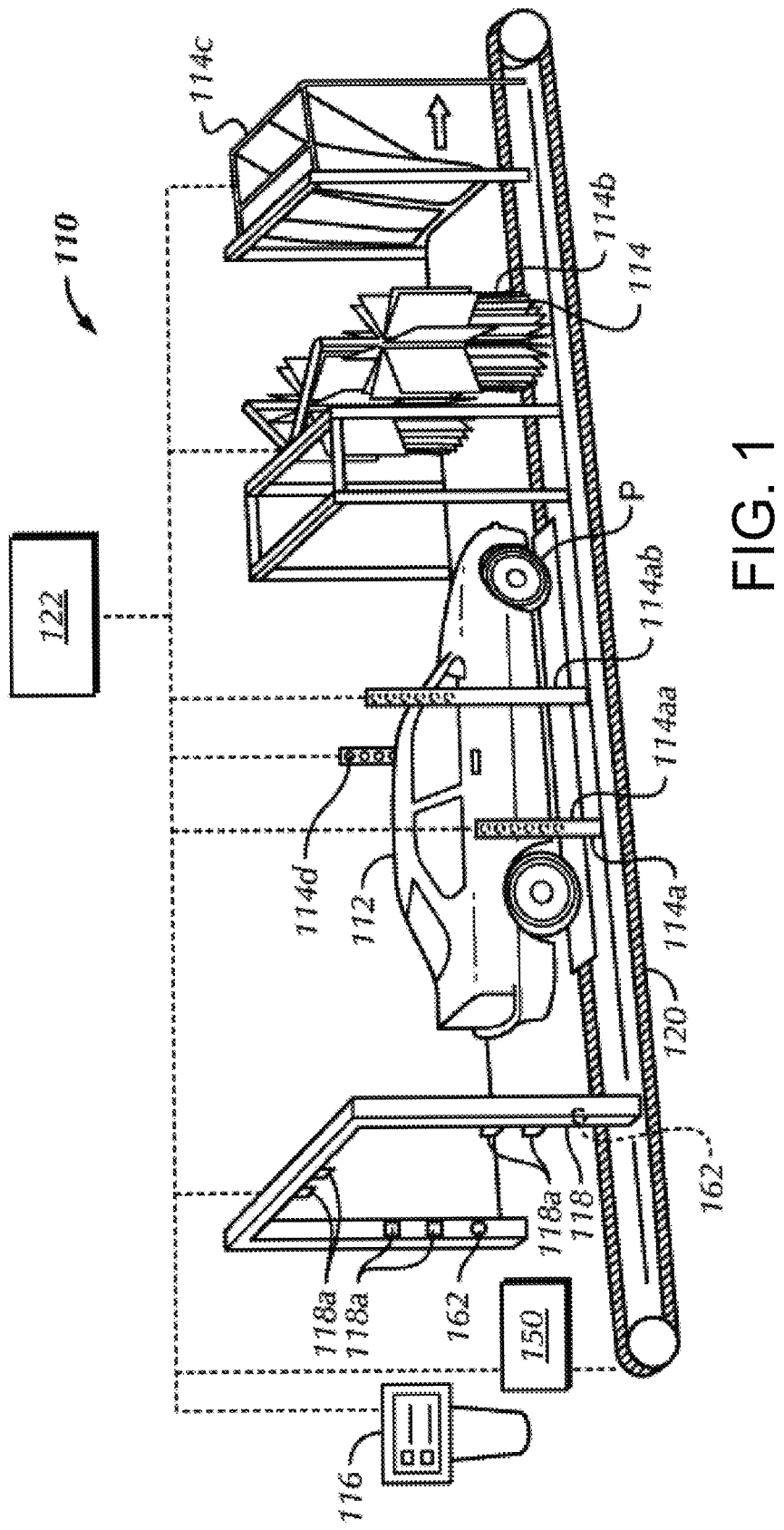
FIG. 1 is a schematic of a vehicle wash system in accordance with one or more embodiments of the present disclosure.

This disclosure is not limited to the particular systems, devices, and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Car washes may accept wash service inputs from kiosks or other computer devices and then activate the proper equipment for a vehicle that is driven through a wash system. In an example car wash system, a controller turns on appropriate outputs and/or relays which are attached to various wash equipment. In other examples, a tunnel controller senses movement of the vehicle entering the wash tunnel and activates the wash equipment through the controller at predetermined points during the wash cycle.

In some examples, a pulse switch may provide for steady movement of the chain or conveyor that the vehicle rides on and some control systems measure only the beginning and end of vehicle travel. In such systems, there may be no adjustment of equipment performance beyond start/stop action at predetermined points in the tunnel. In other systems, irrespective of the vehicle shape and conveyor speed, the top and side washers of vehicle washes spin at fixed revolution per minute (RPM), and are often too close or too far away from the vehicle for optimal cleaning. Moreover, whenever the conveyor speed is changed to process more vehicles per hour, it is necessary to manually adjust chemical flow, equipment RPM and pressure settings to maintain wash performance. It has been known to put sensors on the wash equipment to adjust to the shape and size of the vehicle being washed, but such sensors are then subject to the harsh wash environment and only control a single wash component.

Accurate equipment positioning control (EPC) to adjust for vehicle size and conveyor speed remains a challenge in the car wash industry.

Referring to the drawings in detail, wherein like reference numerals indicate like elements throughout, there is shown in FIGS. 1-8 a vehicle wash system, generally designated 110, in accordance with exemplary embodiments of the present disclosure.

Embodiments disclosed herein include a method and system for obtaining one or more outer contour measurements of a vehicle 112. The one or more contour measurements of the vehicle 112 may be transferred to automated vehicle wash equipment 114 such that the wash equipment 114 may accurately, efficiently and closely wash the vehicle 112 while reducing or eliminating damage to the vehicle 112 caused by the wash equipment 114. In one embodiment, the commands for operating the wash equipment 114 may be based, at least in part, on the measured speed and/or position of the conveyor 120 moving the vehicle 112 through the wash equipment 114.

In one embodiment, the contour of the vehicle 112 is measured proximate an entrance of the wash system. In one embodiment, the contour of the vehicle 112 is measured in a clean, drier, less hostile environment than inside the car wash. In one embodiment, data representing the contour or profile of the vehicle 112 is read, stored and streamed to one or more distributed control system processors that in turn will position numerous pieces of wash equipment 114 to the specific shape and position of the vehicle 114. The wash equipment 114 may include soap or chemical sprayers 114a, brushes or wraps 114b and dryers 114c or any vehicle wash equipment that may be known or implemented. The wash equipment 114 may be any device(s) suitable to wash and/or dry vehicles 112. As used herein, the terms vehicle and car are used interchangeably and the vehicle wash system 110 may be used to clean a variety of moveable objects such as, but not limited to, boats, cars, buses, trucks, campers and trailers.

In one embodiment, the present vehicle wash system 110 includes a sophisticated computer assisted wash system in which each vehicle 112 is profiled, system parameters are monitored, and washing equipment 114 is precisely controlled, to deliver an optimal wash. In one embodiment, the profile is a 3-dimensional representation of the vehicle 112. In one embodiment, the profile is a series of 2-dimensional representations or slices of the vehicle 112 taken every predetermined distance the vehicle 112 is moved along by the conveyor 120. In one embodiment, the system parameter that is monitored is the position of the conveyor 120 relative to the scanning arch 118. In one embodiment, the system parameter that is monitored is the speed of the conveyor 120. In one embodiment, the system parameter that is monitored is water, chemical, and/or energy usage as described further below.

In one embodiment, the system 110 accepts wash service inputs from a user into a kiosk 116 and then the conveyor 120 guides the vehicle 112 through the wash tunnel. A controller 122 may sense the vehicle movement and/or determine the position of the vehicle 112 based on the vehicle profile and/or conveyor speed and/or position and activate mechanical washing equipment 114 at appropriate points during the wash cycle. In one embodiment, the controller 122 has an accuracy of one (1) inch of chain travel, and is capable of integrated web based management plus enhanced diagnostics and error reporting capabilities. In some embodiments, a sophisticated web and microprocessor-based controller 122 may provide the capability for reduction of chemicals and energy usage as discussed further below.

In some embodiments, vehicle wash system 110 may include software management systems such as Tunnel Master™, Lube Master (LM), Point of Sale (POS), AutoSentry-A (ASA), Auto Sentry-eXP (AS-eXP), Auto Sentry-FLEX, Wash Valet, and/or TouchNClean. Vehicle wash system 110 may also include one or more embedded micro controller/micro processor based equipment control products such as Input Terminal, Tunnel Master Junior (TMJ), and a Web Based Controller (WBC). Input terminals or a kiosk 116 may be used for accepting wash services orders from a customer or user prior to entering the wash.

In one embodiment, management system software allows system operators to configure various devices, cash management and view reports. The management system Lube Master, for example, may deliver increased operating efficiency and improved profitability in a similar way it does for the quick lube industry. Self service kiosk systems such as Auto Sentries & TouchNCleans may be used to offer various options for the user to buy available vehicle wash services and packages through the kiosk 116.

Figure 2:
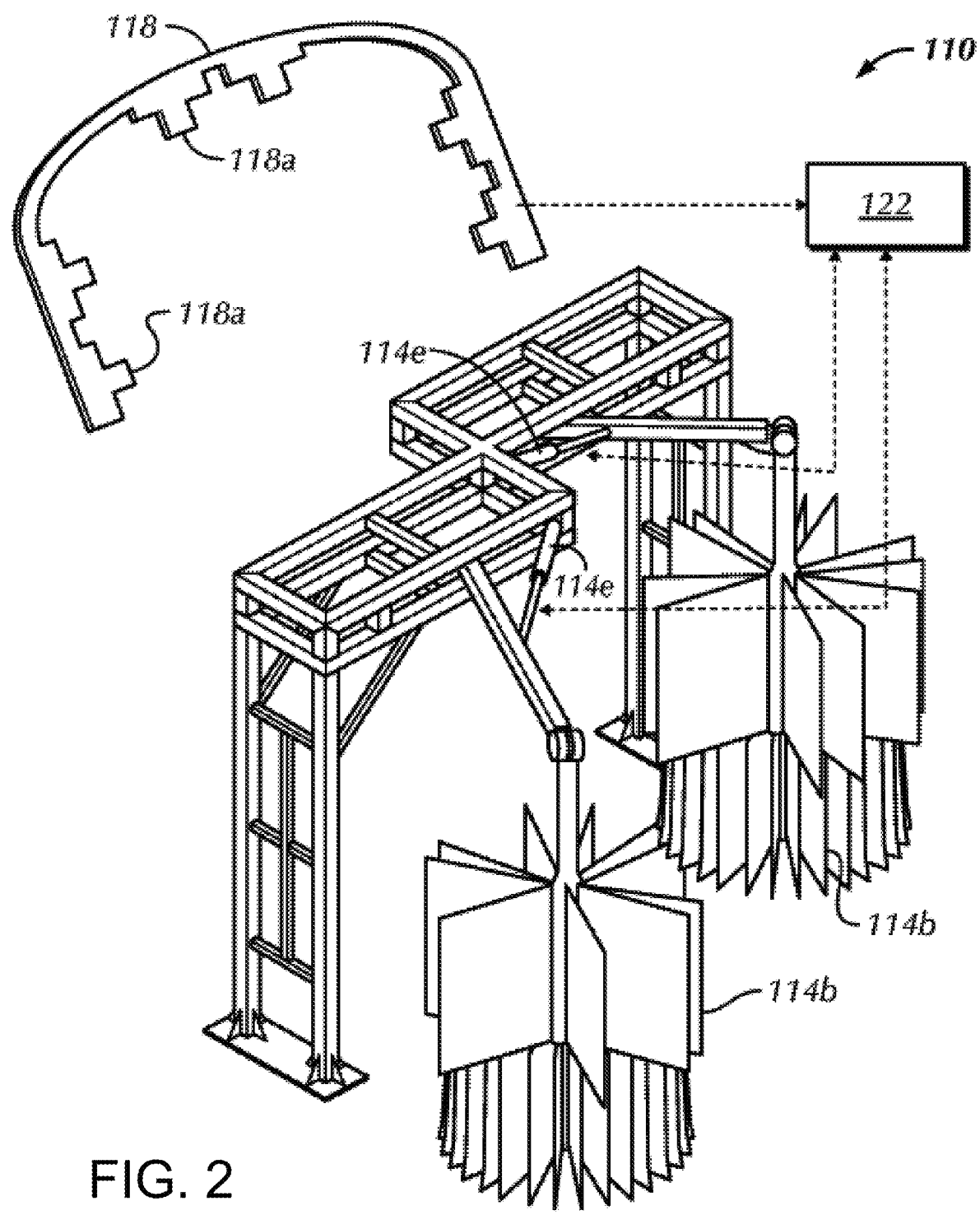
FIG. 2 is a further schematic of the vehicle wash system shown in FIG. 1, in accordance with one or more embodiments of the present disclosure.
Figure 6:
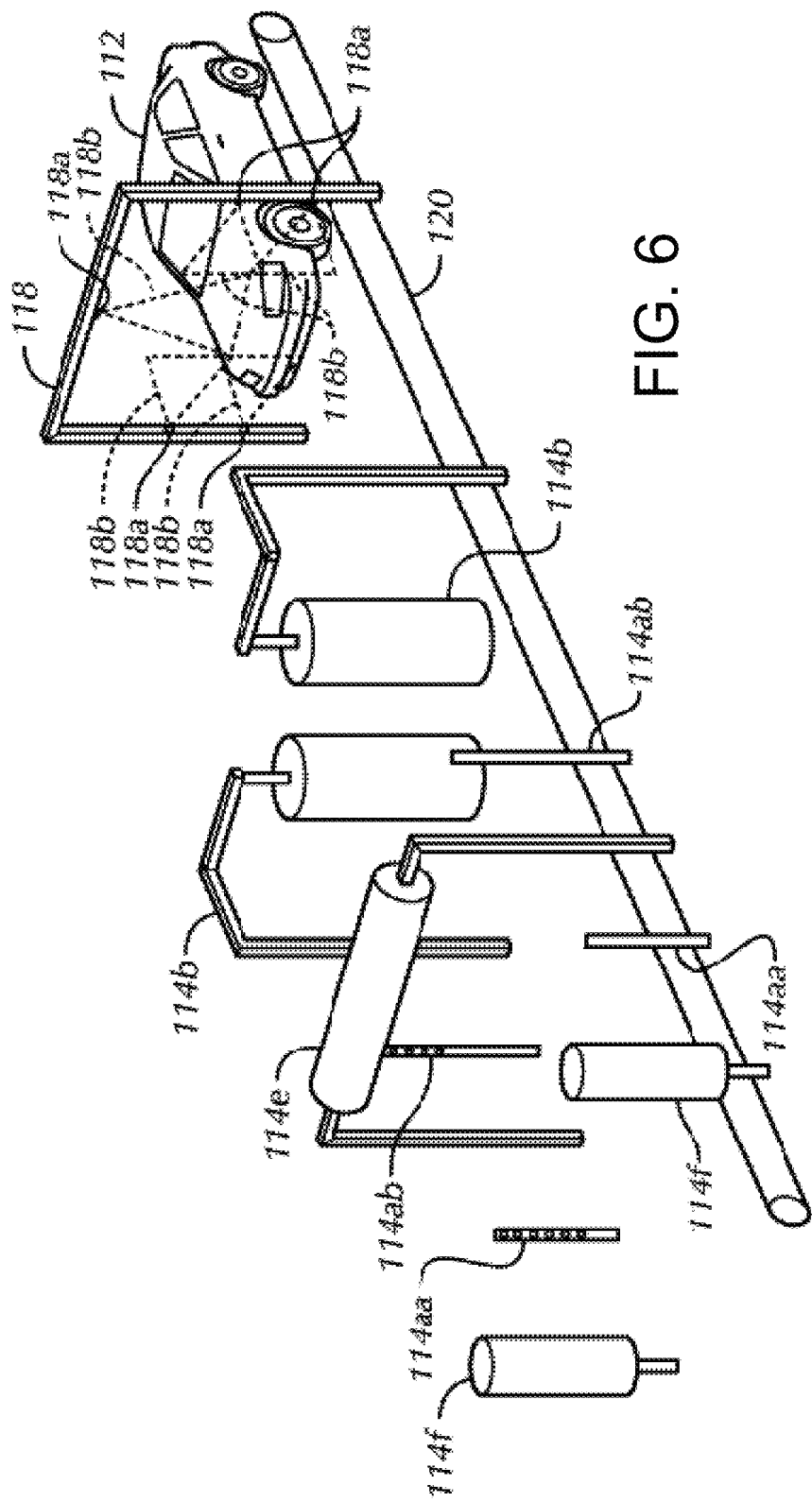
FIG. 6 is a schematic of a vehicle wash system in accordance with one or more embodiments of the present disclosure.

FIGS. 1 and 2 illustrate an exemplary controller 122, vehicle scanning arch 118 and specific wash equipment 114 in a tunnel type car wash. The schematic in FIG. 2 shows only a brush or wrap 114b for simplicity. FIG. 6 is another simplified schematic showing an alternative arrangement of wash equipment 114. In one embodiment, the actual control by the controller 122 will extend to all wash equipment 114 in the wash tunnel based on the profile measured outside the wash environment. In other embodiments, the control of the controller 122 extends on only select wash equipment 114 such as the chemical arches 114a and brushes or wraps 114b but not the dryers 114c. In some embodiments, controller 122 does control dryers 114c.

In one embodiment, after using the kiosk 116 and being positioned on a conveyor 120, the vehicle wash system 110 measures vehicle height, driver side position, and passenger side position along the length of the vehicle 112. In one embodiment, the side and top positions of the vehicle 112 are measured along predetermined increments along the length of the vehicle 112. In one embodiment, the wash equipment 114 is positioned based on this data and the measured position and/or speed of the conveyor 120.

In one embodiment, based on the measured profile of vehicle 112 and/or selected system operating parameters, controller 122 may control the wash equipment 114 functionality such as hydraulics, drive speed, control and feedback, chemical application and motor sequencing.

In one embodiment, the vehicle wash system 110 adjusts, at least in part, according to system parameters such as the actual speed and/or position of the conveyor 120. This may be significant in some systems as the measured or actual speed/position of the conveyor 120 may differ from the programmed speed of the conveyor 120 due to the weight of the vehicle 112, and/or equipment wear or failure.

In one embodiment, the vehicle wash system 110 is a closed loop system. In some embodiments, a closed loop system more accurately washes vehicle 112 and/or conserves resources such as energy, soap and water than an open loop system. In some open loop systems, if the actual conveyor speed and/or position does not match the set conveyor speed and/or position then the actual position of the vehicle will not be in the calculated position resulting in an inaccurate and/or damaging wash. Further, in some embodiments, in an open loop system, the conveyor speed may be accurately monitored, but the calculated position may still be inaccurate. This may be, for example, because a customer uses the brakes or turns the steering wheel of vehicle 112, resulting in the vehicle moving relative to the conveyor. The vehicle may thereby jump over a roller pushing the vehicle, resulting in the vehicle being picked up and pushed by a separate later roller. In some embodiments, a safety roller may follow each vehicle, resulting in some known displacement relative the expected location, typically 3'6". In other embodiments. Alternatively, the vehicle may fall out of the conveyor track entirely. In such embodiments, an open loop control system may not recognize that the vehicle is no longer in the expected location.

Referring again to FIG. 1, the vehicle wash system 110 may include a scanning arch 118 that the vehicle 112 passes through prior to being washed to measure the profile of the vehicle 112 once it is on the conveyor 120. The scanning arch 118 may include one or more sensors 118a that each read one or more contours of the vehicle 112. In some embodiments, the sensors 118a are attached to a tunnel or other structure rather than a separately provided scanning arch 118. In one embodiment, the plurality of sensors 118a each measure the distance from the respective sensor to a surface of the vehicle 112.

In one embodiment, the sensors 118a are placed proximate with a vehicle sense switch (e.g., gate switch 162). In one embodiment, each sensor 118a is in-line with the gate switch 162. The sensors 118a may communicate with the controller 122 over Ethernet or an RS485 port. In one embodiment, a PC or SBC supports multiple RS485 ports or a RS232 to RS485 converter is chosen. The PCs or SBCs may come with several COM ports. In one embodiment, two or three sensors 118a may be assigned to one COM port or if there is a latency issue, then each sensor 118a can be assigned to an individual COM port.

In one embodiment, the vehicle wash system 110 includes six (6) sensors which read three (3) surfaces of the vehicle 112 such as the top, passenger side and driver side. In one embodiment, one or more sensors 118a are provided for each side of the vehicle 112. In some embodiments, two or more sensors 118a are provided per side of the vehicle 112 in order to get additional measurements spaced around the outer contour of the vehicle 112 and/or for redundancy. For example, the side sensors 118a may read different aspects of the vehicle 112 due to their vertical position. For example, if a lower sensor 118a reads a distance into a wheel well of the vehicle 112, the distance from the upper sensor 118a reading the distance to the side panel of the vehicle 112 above the wheel well may be used. Conversely, if the upper sensor 118a misses the side of the vehicle 112 and the lower sensor 118a reads the side panel of the vehicle 112, the data from the upper sensor 118a may be selectively discarded. An algorithm associated with controller 122 may be implemented to determine which value should be used in determining operation parameters of system 110. For example, in one embodiment, if one sensor 118a reads zero (e.g., does not read a surface of the vehicle 112) and an adjacent sensor 118a reads a non-zero value, then the non-zero value shall be used. In one embodiment, if both sensors 118a read non-zero, then the greater value is used. More than one sensor 118a per side of the vehicle 112 may provide a more accurate image of the surface being profiled. In one embodiment, two sensors 118a per side is the minimum number of sensors 118a needed to accurately measure all sizes of vehicle 112 in a conventional-type car wash.

Sensors 118a may be any sensor that measures a distance from a fixed or known reference point (e.g., on the scanning/profiling arch to the outer contour of the incoming vehicle 112). In one embodiment, each sensor collects data within a respective scanning area 118b. In one embodiment, the sensors 118a are ultrasonic sensors. In one embodiment, the sensors 118a are Automatic Product Groups (APG) ultrasonic sensors. Because ultrasonic sensors use sound rather than light for detection, they work in applications where other sensors may not. Ultrasonics may be preferred for clear object detection applications that other sensors struggle with because of target translucence. Target color and/or reflectivity may not affect ultrasonic sensors which can operate reliably in high-glare environments. In other embodiments, the sensors 118a are any device configured to determine a distance to the surface of the vehicle such as infrared sensors, laser, radar or photoelectrics.

Ultrasonic sensors may measure distance by using a transducer to send out ultrasonic bursts. Each burst may contain a series of pulsed sound waves. The ultrasonic burst may emit in the shape of a cone, reflects off the detected target, and is received by the transducer. In one embodiment, controller 122 is configured to measure the time required for this burst to travel to and from the target. In one embodiment, the time is measured and converted into a distance measurement by the sensor 118a.

Ultrasonic sensing may be affected by several factors including the target's surface, size, angle and the distance from the sensor. Environmental conditions such as temperature, humidity, gases, and pressure may also affect the measurement. Industrial grade sensors are built to compensate for the above mentioned varied environments. Though ultrasonic sensors are described herein, any device configured to measure the distance to the vehicle's outer surface may be used. Some of the factors considered in selecting sensor type include surface characteristics, distance, object size and object inclination angle. In some embodiments, placement and position of the sensors 118a is dependent on the type of vehicles 112 being washed. For example, vehicles 112 having hard and smooth surfaces reflect a greater amount of signal than vehicles 112 having a soft or rough surface, placing the sensors 118a closer to the vehicle 112 results in a stronger return echo, larger objects have more surfaces to reflect the signal than smaller ones, and an object perpendicular to the sensor 118a has greater echo than an angled object. In one embodiment, the side sensors 118a are generally perpendicular to the side panels of the vehicle 112 and are approximately 136 inches apart and approximately 30 inches and 39 inches, respectively, from the ground. In one embodiment, the top sensor(s) is generally perpendicular to the top surfaces of the vehicle 112 and are approximately four inches apart and 106 inches from the ground. In embodiments where a side sensor 118a includes a pair of sensors 118a as described above, the sensors 118a are approximately 9 inches apart from one another. In one embodiment, the gate eyes 162 are approximately 21.5 inches from the ground and 136 inches apart.

In one embodiment, an ultrasonic sensor has a minimum response time of 100 ms for reading a distance. In one exemplary embodiment, at 200 cars per hour, scanning the vehicle every 2 inches of conveyor travel requires a scan every 125 ms. In such an embodiment, each scan requires the profiling CPU to issue a scan command, wait for the sensors 118a to physically perform the scan, read the scanned data from the sensor array, interpret and optimize the data from the center point (inside rail on the conveyor deck) and then transmit the scanned data to the distributed CPUs. In such an embodiment, such processing may require a significant amount of CPU resources to complete these tasks up to 8 times per second. In one embodiment, the secondary devices need to have the memory to store multiple vehicle profiles, compare offsets to the stored values, provide the analysis to determine positioning, rpm, failure states, etc. CPU and memory resources may need to be expanded for systems having longer conveyors, conveyors operating at faster speeds and larger numbers of control devices (e.g., corresponding to more operational equipment).

Sensors 118a may be positioned on any structure preferably at the beginning of vehicle wash system. For example, sensors 118a may be placed in the entrance of a wash tunnel. In one embodiment, as soon as a gate switch 162 is actuated, sensors 118a connected to controller 122 begin generating a vehicle profile by reading the distance to the vehicle 112 from the sensors 118a. The profile of the vehicle 112 is measured when the gate switch 162 indicates a vehicle 112 is within the scanning arch 118.

In one embodiment, the sensors 118a are synchronized so that the measurements are taken concurrently. Each sensor 118a may for example, have a clock sync that can be tied to the clock sync of other sensors. This synchronizes the transmitted pulses of the individual sensors and helps to prevent any cross talk.

In one embodiment, where pulsed or spaced measurements of the vehicle 112 are recorded rather than a constant recording, the algorithm optimizing the contour values so that the incremental readings are converted to a closer contour of the vehicle 112 rather than a stepped contour of the vehicle 112. Due to variations in the size of vehicles 112, in one embodiment, two sensors 118a may be provided per side of the vehicle 112. In one embodiment, at the same fixed interval, each sensor 118a will read the distance to the outer vehicle surface.

In one embodiment, errors in a reading may be apparent. For example, one of the side sensors 118a may read over the hood of the vehicle 112 or into a wheel well on a truck. Such errors may be filtered by system 110, for example, by selectively using the closest distance as the dimension read. In one embodiment, when positioning a brush or wrap 114b away from the vehicle 112, taking the reading that is closest to the scanning arch 118 provides the vehicles surface that is furthest from the center of the vehicle and, in some instances most likely to impinge upon, disrupt or be damaged by vehicle wash equipment.

In one embodiment, the controller 122 may use one or more sensors 118a to determine the presence of a pickup bed for a vehicle 112. For example, a quick drop in vehicle height over a predetermined distance may be determined by the controller to be a pickup truck such that wash equipment 114 does not drop into the pickup bed potentially damaging the wash equipment 114 (e.g., a dryer 114c) and/or spraying dirt and debris from the pickup bed onto the truck and subsequent vehicles. In one embodiment, there is a minimum drop distance measured by a top sensor 118a that is generally maintained for a predetermined length to determine the presence of a bed. For example, if a drop distance of approximately 18 inches is measured and remains generally the same for at least 12 inches, then a bed is likely present and wash equipment 114 such as a dryer 114c is adjusted accordingly for the bed.

In one embodiment, all readings from side sensors 118a may be converted to a distance from the inside rail of the conveyor 120 at the conveyor deck to the outermost surface of vehicle 112. In one embodiment, the conveyor deck is the surface upon which the vehicles tire rolls and the outside rail is what keeps the cars tire in the conveyor 120 and controls side to side movement of the car.

As described above, in an exemplary embodiment, system 110 includes equipment that that is controlled based upon the measured contour of vehicle 112 and/or other system parameters. For example, equipment parameters that might be controlled include motor operating speed, angular velocity of wash equipment, length of travel of wash equipment, position of wash equipment, chemical application rates, chemical application location and/or chemical application quantities. System parameters that may be used to control equipment may include the actual speed of vehicle conveyor and vehicle position on the conveyor. Thus, for example, in one embodiment, the position of a vehicle's sides or contours (e.g., the outer driver side, passenger side and top) is determined relative to a selected and/or assigned reference point associated with the conveyor 120. That reference point may be a physical reference point P (e.g., a point on the inside rail of the conveyor 120, see FIGS. 1 and 8). In one embodiment, where the conveyor speed is known and the scanning arch 118 is scanning the profile of the vehicle 112 at fixed intervals, (for example every 2 inches of conveyor travel), a position on the conveyor 120 may be defined in inches from the respective sensor 118a.

A specific example is now provided for illustration. For example, if 500 inches of conveyor travel occurred before the first vehicle 112 entered the scanning arch 118 (e.g., start of vehicle 112 actuating the gate switch 162), the first scan would read: 500, 25, 46, 32; with 500 being the position on the conveyor, 25 being the distance from the inside edge of the conveyor measured horizontally to the widest part of the driver side contour, 46 being the measurement from the inside rail on the conveyor to the widest point on the passenger side scan, and 32 being the highest horizontal point of the scan measured from the conveyor deck. In one embodiment, up to six scans are buffered in memory before sending to other peripheral devices, such as a programmable logic controller (PLC) or an embedded control system, that directly control the positioning, RPM, chemical or pumps. In one embodiment, buffering six scans in memory allows for twelve inches of vehicle profile that the controller 122 can evaluate to throw out erroneous reads and optimize the profile. The profile data is then streamed to the processor controlling the appropriate equipment 114. In one embodiment, if a read from a sensor 118a falls out of the deviation, the data point is interpolated. In one embodiment, the scanned data from the sensors 118a is optimized and the updated values are sent to the distributed processors responsible for the direct equipment control.

In one embodiment, the data is streamed directly to the secondary or control devices over RS 485, wireless or Ethernet. In one embodiment, the streamed data indicates the position of the vehicle 112 relative to the conveyor movement, the start of a vehicle 112 may have an optimized data packet, for example 500, 25, 46, 32 after 2 more inches of chain travel the next packet sent will read, for example 502, 26, 48, 40. In one embodiment, these packets are temporarily stored in battery backed up RAM in all the distributed control devices. In one embodiment, a specific piece of equipment 114, such as a driver side brush or wrap 114b, is configured to be 150 inches downstream from the scanning arch (specifically the gate switch 162). In one embodiment, after 75 more, 2 inches movements of the chain are read, the control system 122 will move the equipment 114 to conform to the measurements of 25 inches from the inside rail of the conveyor for the driver side brush or wrap 114b. In one embodiment, when the system is expecting the next 2 inches increment of chain movement (pulse), the system will have repositioned the driver side washer at 26 inches, the passenger side washer at 48 inches.

In one embodiment, knowing the profile of the vehicle and the position of the vehicle 112 on the conveyor allows for the controller 122 to accurately anticipate where the vehicle will be with respect to each piece of wash equipment 114.

In one embodiment, the profile of the vehicle 112 is measured every time the conveyor 120 moves a predetermined distance in order to reduce the amount of processing power and/or memory required as the exact profile of every inch of the vehicle 112 may not be necessary. In such embodiments, the contour of the vehicle 112 may be optimized as discussed above to approximate the profile of the vehicle 112. In other embodiments, the sensors 118a measure a continuous or near continuous distance to the vehicle 112 (e.g., more frequent readings) if, for example, a more accurate washing profile is desired.

In one embodiment, vehicle position is associated with conveyor chain travel. For example, in the embodiment of FIG. 1, vehicle movement is tied to a sensor 150 such as a pulse switch, which measures chain travel of the conveyor 120 such that the wash equipment 114 down stream of the scanning arch 118 follows the measured contour of the vehicle at the appropriate time. In some embodiments, tying the profile of the vehicle to the position of the conveyor is advantageous since the actual speed/position conveyor 120 may vary from the set speed of the conveyor 120. In some embodiments, the actual speed/position of the conveyor may differ from the set/calculated speed of the conveyor due to the varying weight of the vehicles 112 or a mechanical failure (e.g., jam). In one embodiment, the speed of the conveyor 120 is increased if the speed measured by the sensor 150 is less than the set speed of the conveyor 120.

In one embodiment, once a vehicle profile is created for a vehicle 112 entering the vehicle wash system 110, the controller 122 adds this vehicle 112 to a wash queue. The controller 122 may apply the start and stop times relative to each controlled piece of equipment 114, and the measured profile may be used to calculate how far to hold the brush or wrap 114b away from the vehicle 112 for optimum cleaning. By adjusting the washer movement away from the vehicle 112, the equipment 114 will have freedom to move further utilizing its own mechanical action if there is a malfunction of computer assisted cylinders 114e, for example. This ensures, in one embodiment, that the existing mechanical default conditions for the equipment 114 remain in force to avoid or reduce damage to the vehicle 112.

In one embodiment, the hydraulic or electric control of washer RPM is also controlled. If conveyor speed is changed in systems where the washer RPM is not controlled and there is no automatic adjustment relative to conveyor speed, the washer RPMs may be manually adjusted to be proportional to the conveyor speed. In one embodiment, the sensor 150 may read the conveyor position and the controller 122 may adjust the RPM of the washers 144b without the need for manual adjustment. The speed or RPM of the brush or wrap 114b can also be controlled based on the surface of the vehicle 112. For example, a brush or wrap 114b could operate at a first RPM on the front and a slower RPM on the side of the vehicle 112 but increase to a third RPM at the rear to improve action and cleaning. In one embodiment, a brush or wrap 114b is slowed around objects extending from the vehicle 112 such as mirrors and antennas. In one embodiment, by utilizing the profiled vehicle inputs and conveyor speed or position as described herein, the chemical and/or water usage may be better managed to provide a more uniform distribution of chemicals on the vehicle 112 while avoiding, for example waste associated with the same amount of chemical and/or water is being sprayed, irrespective of vehicle size and conveyor speed as discussed further below. For example, as the conveyor speed increases, pressure is increased to ensure the same volume of chemical and/or water is applied to the vehicle 112 even though the application time is shorter. For example, a spray nozzle 114d may wear and monitoring the pressure would allow the operator to replace the nozzle 114d. In one embodiment, a pressure transducer may be used to monitor the pressure. In other embodiments, the pressure is not monitored and instead the vehicle wash system 110 relies on mechanical over-pressure limits as described above. The system will maintain the same pressure based on the readings from the pressure transducer. The RPMs of the motor and pump will change if a spray nozzle wears or is clogged. The variance in RPM would trigger the appropriate error message.

Figure 3:
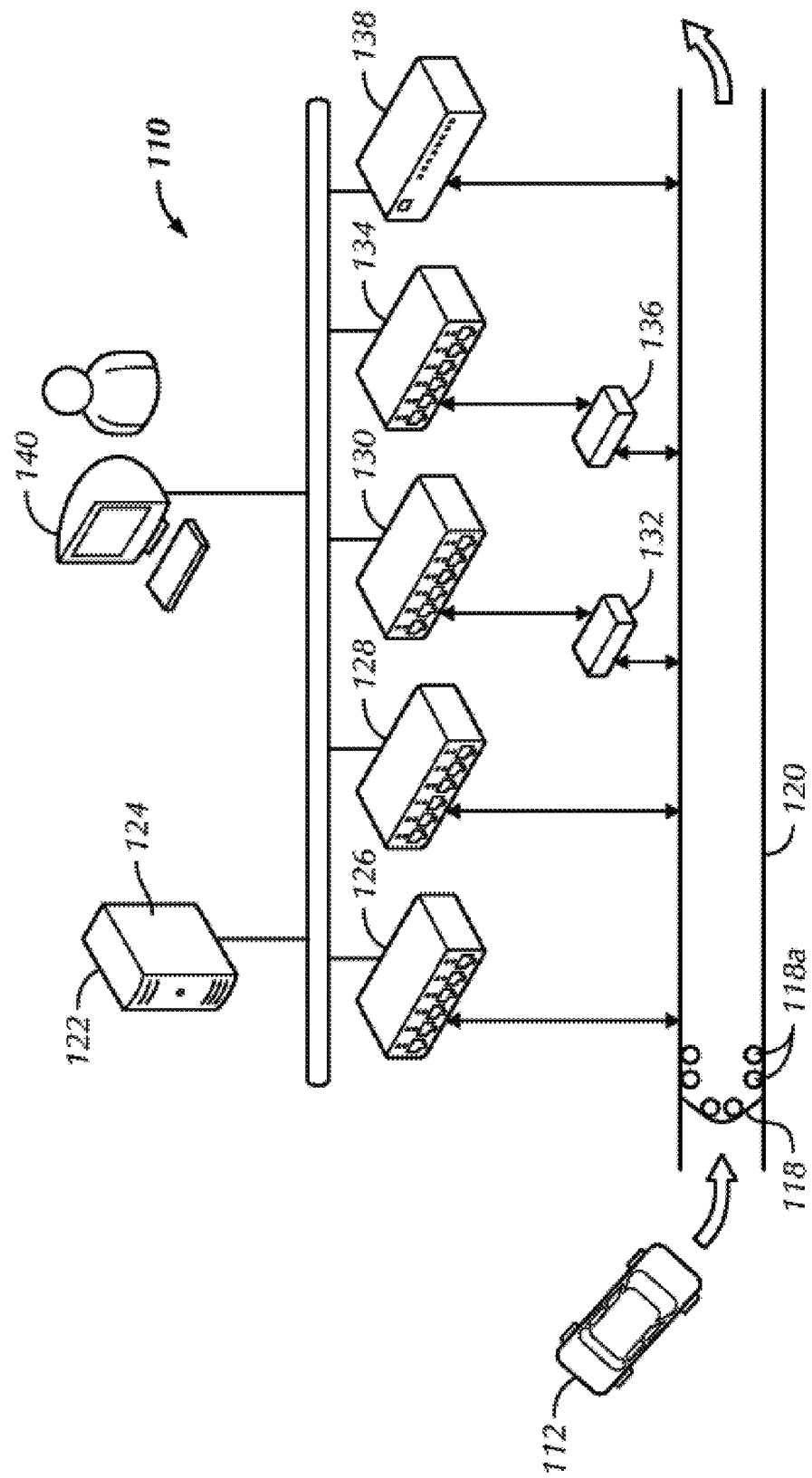
FIG. 3 is a schematic of a controller of the vehicle wash system in accordance with one or more embodiments of the present disclosure.

Referring to FIG. 3, in one embodiment, controller 122 runs on either a single board computer (SBC) or PC 124 that serves as master, controlling all other secondary devices. Each secondary device (e.g., equipment control and feedback controller 126, hydraulics controller 128, chemical flow controller 130, chemical flow controller 132, motor start controller 134, motor control center 136 and the WBC 138) may have I/O capability with standalone processing. The primary and secondary devices may communicate to one another over a network such as a wide area network or a LAN; thus simplifying standard transmission control protocol/internet protocol (TCP/IP) socket calls. The user may have access to and control the system 110 through a client station 140 such as a PC or a kiosk.

Exemplary hardware selection may include a Single Board Computer. In one embodiment, the computer is a PC with a CPU speed >2 GHz, 2G RAM and 4 COM ports may be used. Exemplary Ethernet I/O may include a Phoenix Ethernet I/O or Ethernet IP PLC having a response time of 10 ms for I/O operations is utilized. In another embodiment, the Ethernet I/O is an Omron and/or Allen Bradley Ethernet IO or Ethernet IP PLCs. In one embodiment, programming the Ethernet I/O PLCs includes structured text—very similar to C+ or C++ programming, ladder logic, function blocks and sequential functions. Exemplary elements to electronically control the brush or wrap drive motor speeds (driver and passenger sides) may include: (2) proportional directional valves (+/−10 VDC), (2) pressure relief valves, (2) pressure compensator valves, optional electronic speed feedback is 0-10 GPM flow meter with 0-10 VDC output for flow monitoring. Exemplary conveyor speed control may include a manifold assembly having a proportional directional valve (+/−10 VDC) and a pressure compensator valve. In one embodiment, optional electronic speed feedback is 0-10 GPM flow meter with 0-10 VDC output is used for flow monitoring.

An Ethernet-based PLC may be utilized for all secondary devices. In one embodiment, the PLC handles both digital and analog inputs and outputs, and will provide for a distributed processing model for the SBC performing the vehicle scanning over TCP/IP. In some embodiments, a PLC may perform the vehicle scanning as well.

Referring to FIG. 3, controller 122, in one embodiment, targets improved customer experience, cleaning and tunnel capacity via computer assisted vehicle profiling and computer based equipment control. Memory, or alternatively one or more storage devices (e.g., one or more non-volatile storage devices) within memory, includes a computer readable storage medium. In some embodiments, memory, or the computer readable storage medium of memory, stores programs, modules and data structures, or a subset thereof as described below for one or more processor to control various wash equipment 114.

Figure 4A:
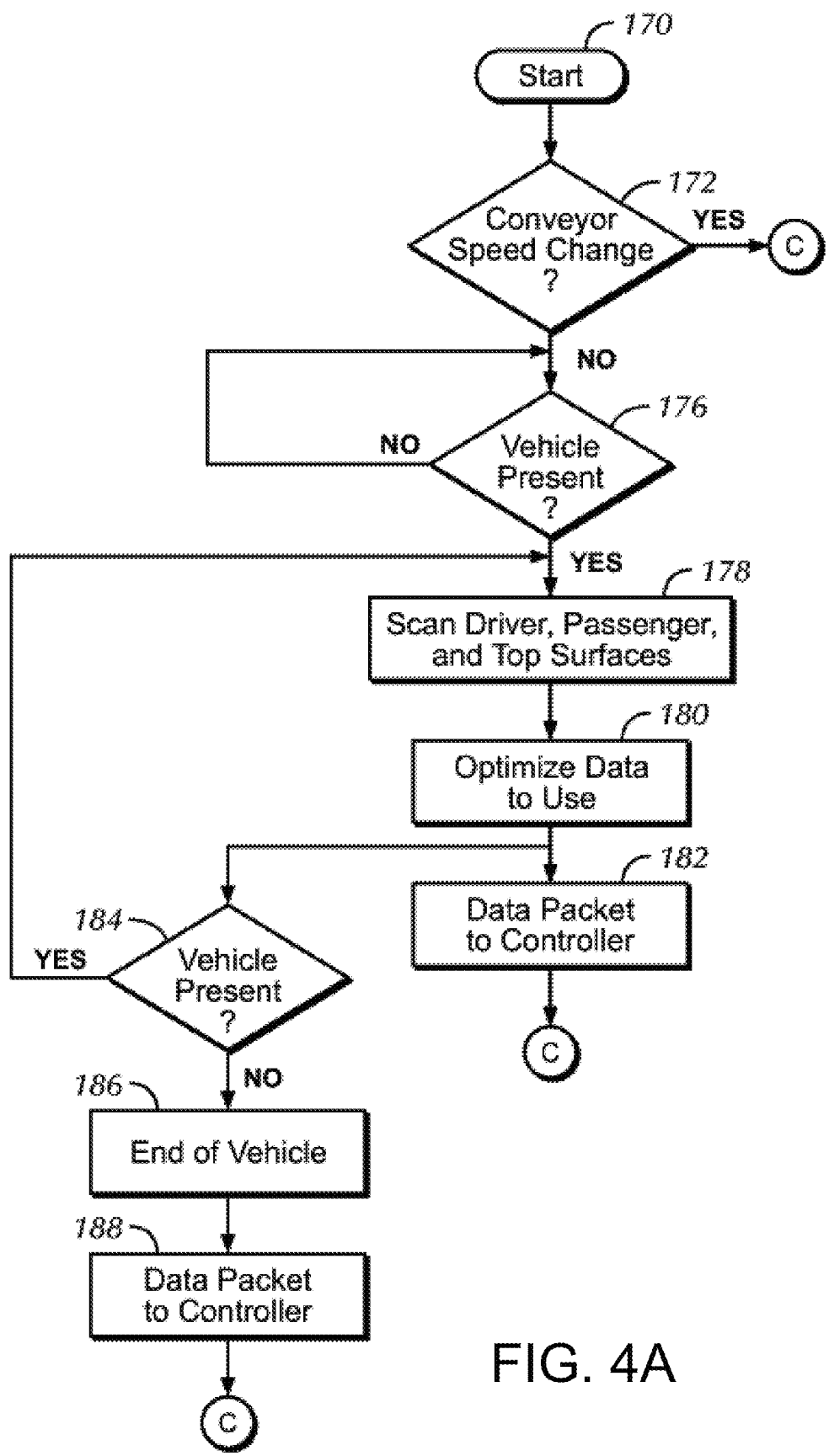
FIG. 4A is an exemplary flow diagram of the profile scanning and streaming of a vehicle in the vehicle wash system shown in FIG. 1, in accordance with one or more embodiments of the present disclosure.

Referring to FIG. 4A, in an exemplary embodiment, a wash is started at step 170 and the conveyor speed changes are measured by the sensor 150 at step 172 and are sent to the controller 122 at step 174. In one embodiment, once conveyor speed changes are received by the controller 122, the system will ramp the conveyor 120 to the new desired operating set point. In one embodiment, as the conveyor speed as measured by the sensor 150 changes, any associated equipment 114 shall also proportionally adjust its speed. In one embodiment, the system 110 begins by validating the presence of a vehicle 112 at the scanning arch 118 at step 176. In one embodiment, as the vehicle 112 moves through the scanning arch 118 dimensional data consisting of, but not limited to, driver, passenger and top of the vehicles contoured surfaces along with positional data of the conveyor 120 is scanned at step 178, read and optimized by the controller 122 at step 180 and streamed to the secondary device 126 at step 182, at a predefined and configurable rate. In one embodiment, a sensor array processor shall determine the data that is read by the controller 122. In one embodiment, once the end of the vehicle 112 has been detected at steps 184 and 186 the data streaming shall be halted at step 188. In one embodiment, data streaming is restarted once another vehicle 112 has been detected at the scanning arch 118. In one embodiment, the data is read by the controller 122 from the sensors 118a, 150 and assembled into a vehicle parameter data structure (e.g., position of the conveyor and one or more sides of the vehicle from a reference point) as described above. In one embodiment, this vehicle parameter data structure shall be continually accessed as long as that vehicle is contained within the wash process.

Figure 4B:
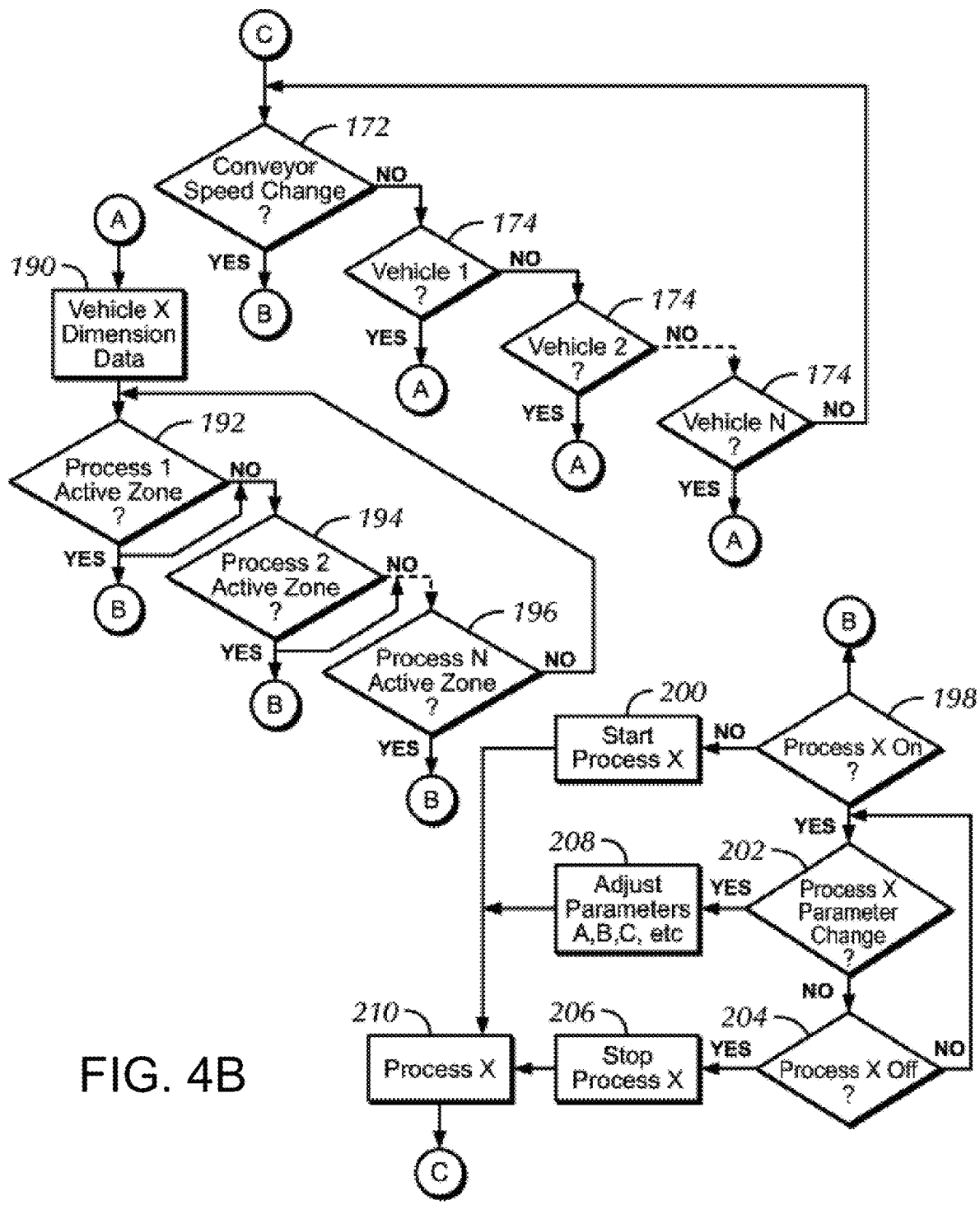
FIG. 4B is an exemplary flow diagram of the processing and washing of multiple vehicles following the profile scanning and streaming of FIG. 4A, in accordance with one or more embodiments of the present disclosure.

Referring to FIG. 4B, in an exemplary embodiment, the vehicle parameter data structure shall be continually monitored with reference to the actual vehicle position within the wash tunnel and its proximity to the various pieces of equipment 114 and processes that are adjusted to the dimensional parameters of the vehicle 112. In one embodiment, as vehicle proximity to equipment and processes are evaluated, adjustments to equipment and processes are continuously optimized and made. In one embodiment, once the end of data is received the system 110 shall be ready to receive the data for the next vehicle 110. This process may be repeated for any number (N) of vehicles 112.

In one embodiment, the vehicle parameter data structures shall be made available for the control of other equipment and processes at step 190. In one embodiment, as a vehicle 112 exits the wash process the vehicle parameter data structure for that vehicle shall be removed from the controller 122 or written over. In one embodiment, due to the velocity at which the vehicle 112 moves on the conveyor 120, higher conveyor speeds will require vehicle profile scans (e.g., at profile arch 118) up to every 125 ms. In one embodiment, distributed processing is required to provide the necessary CPU and memory requirements to achieve these speeds. In one embodiment, the vehicle parameter data structure is streamed to one or more other CPUs 126, 128, 130, 134, 138 each controlling discrete functions at steps 198, 200, 202, 204, 206, 208, 210 such as chemical, equipment positioning, washer rpm, pump control, etc. at steps 192, 194, 196 based on the number and type of control points (see, e.g., FIG. 3). In one embodiment, process X at step 210 is adjusted if the speed of the conveyor 120 changes. In one embodiment, the profiling CPU 122 may also store the vehicle parameter data structure, operate software that manipulates and/or interprets the data and provide direct equipment control commands to the distributed CPUs 126, 128, 130, 134, 138 to reduce data and processing bottlenecks. In one embodiment, the software and hardware architecture is designed to offer maximum flexibility in terms of load balancing and distributing the CPU and memory requirements between the various processors.

In one embodiment, after a vehicle 112 is profiled, the vehicle 112 is added to the vehicle queue in the tunnel. Vehicle queue information may be maintained as the vehicle progresses through the tunnel. Thus, equipment 114 that is controlled by the controller 122 can be properly set (e.g., adjusted for speed, position or other operation parameters) for each vehicle 112.

Figure 8:
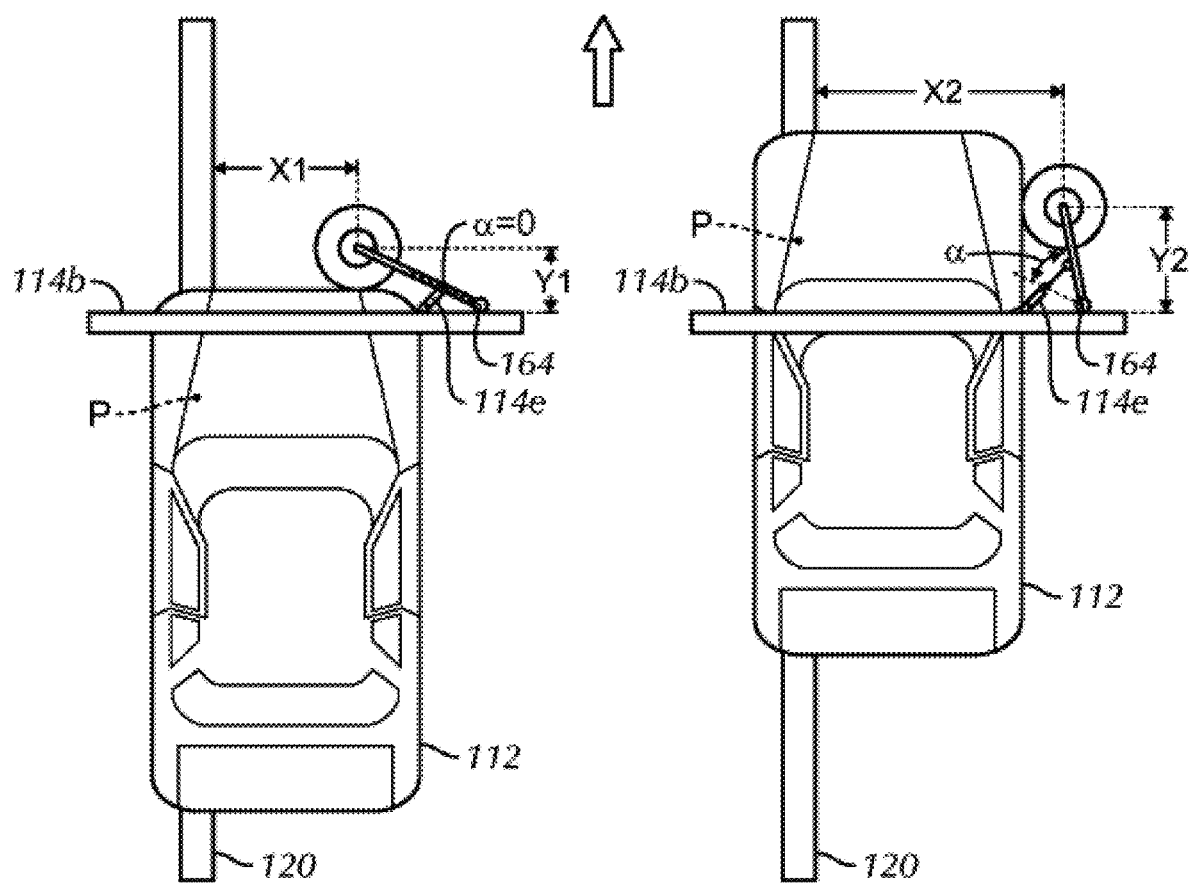
FIG. 8 is a top plan view of a partial schematic of the vehicle wash system shown in FIG. 1, in accordance with one or more embodiments of the present disclosure.

Referring to FIG. 8, in one exemplary embodiment, for every 2 inches of chain travel, the controller 122 will have to take necessary action on the pneumatics 114e to control the brush or wrap 114b. To accomplish this, in one embodiment, the pneumatics 114e control will have a table of values which define the proper voltage for the cylinder movement in inches. By interpolating the profile of the vehicle 112 between the reads from the sensors 118a, the system 110 may determine a smooth vehicle profile that is continually adjusting the wash equipment 114 for the specific shape of the vehicle 112 traveling through the wash. Cylinder positioning may be, for example, a 0-10 VDC signal that corresponds to a cylinder movement of 18 inches. For example, in one embodiment $$\frac{5VDC * 18''}{10VDC} = 9''$$

of travel. (where " indicates inches of travel)

In one embodiment, a hydraulic motor drives the conveyor 120, and the flow of fluid determines the chain speed of the conveyor 120; the conveyor chain speed in turn is used to calculate vehicles washed per hour. In one embodiment, assuming the time taken for one inch of chain travel is 80 milliseconds (ms), the average vehicle length is 200 inches and the distance between vehicles is 36 inches: then, the time taken to process one vehicle 112 is:

$t=(200+36)*0.080)=18.88$ sec

On an average, vehicles 112 per hour would be:

$$vph = \frac{60 \text{ sec} * 60 \text{ min}}{18.88 \text{ sec}} = 190.1$$

The flow of fluid through the conveyor system 120 may be measured using a flow meter which gives a proportionate analog output.

In one embodiment, the conveyor speed setting will have a table of conveyor speeds—gallons/minutes to vehicles 112 washed per hour. In one embodiment, the operator can adjust the flow of the fluid using the controller 122 to the desired vehicles 112 washed per hour.

$$\frac{60 \frac{\text{sec}}{\text{min}} * \text{reduction}}{ChainInchesperrev/(VPM/15)} = motorRPM$$

For example:

$$\frac{60}{[32'' \text{ per } rev/(125 \text{ } VPM/15)]} * 5.2 = 81.2 \text{ motor } RPM$$

In one embodiment, by referring to the specific hydraulic motor data used, the flow rate can be determined by interpolating flow/RPM data. In one embodiment, a motor might have a flow rate of 6 GMP at 72 RPM and at 8 GMP 97 RPM. Therefore, at 7.0 GMP the simplified interpolated RPM could be (97*7)/8=84.88 RPM (assuming linear response to 0 GMP/RPM). To obtain a more precise number, the slope between the 6 and 8 GMP points may used with the equations for a linear line to obtain a more precise value. In one embodiment, the conveyor speed is directly related to the hydraulics drive speed (e.g., equipment RPM). To change conveyor speed, in one embodiment, the hydraulics drive speed may be automatically adjusted by the controller 122 without any manual intervention. In one embodiment, there will be a table of values which would give a gallons/minute to RPM to analog output. The required RPM may then be achieved by writing the analog output to the flow control valve to increase or decrease the flow of fluid. In one embodiment, by reading the hydraulics drive speed at each stage, the system 110 can determine increasing/decreasing flow rate and take necessary action. Furthermore, in one embodiment, the hydraulics drive speed may also be adjusted for part of the vehicle 112 being washed.

Table 1 below illustrates an exemplary flex-wrap or brush profile for a vehicle 112. In one embodiment, if there is no top washer 114e (see FIG. 6), the top of vehicle 112 need not be profiled and sensors 118a may only be provided, or only activated, on the sides of the vehicle 112. A start value of the wash is a numerical value that may signal the most forward point or front of vehicle 112. The other values may be dynamically calculated as vehicle 112 travels through the scanning arch 118 from the 1300 start time. The start time may correspond to the distance from the sensor 118a to the brush or wrap 114b so that the controller may calculate when the vehicle 112 will reach the brush or wrap 114b based on the speed of the conveyor 120. The controller 122 may guide the brush or wrap 114b a required distance by applying the required current to a valve controlling a pneumatic cylinder 114e (see, e.g., FIG. 2). In one embodiment, an encoder or feedback sensor on the primary shaft of the equipment provides positive feedback with respect to the position of the equipment which may help in determining if the equipment 114 is positioned to the desired place in the tunnel.

TABLE 1

Example Flex Wrap Profile
Flex Wrap Profile (Units in inches)

| Start value | Driver Side | Passenger Side | Top |
|---|---|---|---|
| 1300 | 15.6 | 31.8 | 36.8 |
| 1302 | 16.5 | 32.7 | 35.8 |
| 1304 | 16.2 | 32.4 | 32.6 |
| 1306 | 15.9 | 32.1 | 30.9 |
| 1308 | 15.9 | 32.1 | 28.7 |
| 1310 | 15.8 | 32.0 | 28.4 |
| 1312 | 15.8 | 23.0 | 28.2 |
| etc. | | | |

Referring to FIG. 8, in one exemplary embodiment, if a piece of equipment such as a brush or wrap 114b follows the passenger side of the vehicle 112 and is positioned 200 inches from the scanning arch 118 after the conveyor 120 moves to position 700 inches, the passenger side brush or wrap 114b contacts the front of the vehicle 120 at x1, y1 and the angle α of the piston 114e is at zero. In one embodiment, at point x of conveyor travel, the brush or wrap 114b position is moved to x2, y2 and α. In one embodiment, the values of x2, y2 and a are controlled by the extension of the piston 114e as determined by the controller 122. The amount of extension of the piston 114e may be determined by either a table or an equation. An encoder measuring the extension of the cylinder or an encoder measuring the angle of the primary arm can be used to calculate the position and drift of the washer. In one embodiment, there is also mechanical drift that must be taken into consideration as a mechanical arm swings away from the conveyor 120 in an arc, the brush or wrap 114b moves away from the conveyor 120 and down the conveyor 120, from its start point. In one embodiment, mechanical drift is accounted for in the movement of the brush or wrap 114b. In one embodiment, the same start time offset is used on all positioning and rotating washers 114b as well as high and low chemical arches 114a as described further below.

In one embodiment, by correctly positioning wash equipment 114 the optimal distance from the vehicle 112 and setting the appropriate RPM, overall cleaning may be improved, noise will be reduced, damages will be significantly reduced, and the customer experience will be significantly enhanced. Furthermore, more vehicles per hour may be able to be washed with the same equipment 114 by automatically adjusting settings to offset the usual negative effect of higher conveyor speeds. Finally, closed loop control may permit early identification of equipment failure conditions and enhanced maintenance scheduling.

FIGS. 9A-9D illustrate one embodiment of a pneumatic system incorporating a secondary pneumatic actuator 200 that assists in controlling the movement and positioning of a mechanical arm 300 of a cleaning wrap 310 relative to an arm support 320 and a vehicle 112. In the illustrated embodiment, the pneumatic 200 is a rodless air cylinder 210 that is attached at one end 212 to the arm support 320 by a bracket 202 that enables the cylinder 210 to pivot relative to the arm support 320. In one embodiment, the arm support 320 can be a stationary arch through which a vehicle travels, or it can be a stationary post or the like. The cylinder 210 is also attached to the mechanical arm 300 of the cleaning wrap 310 through a movable guide 330 secured to the mechanical arm 300 that functions as a bushing and allows the cylinder 210 to slide through the movable guide 330 as the mechanical arm 300 moves and pivots relative to the arm support 320. While a rodless air cylinder 210 is described, it will be appreciated that other pneumatic actuators or functional equivalents may be used.

The rodless air cylinder 210 has an internal piston 220 that moves within an interior 230 of the cylinder 210 between a first end 212 of the cylinder 210 and a second end 218 in response to a fluid supply 232 such as air or the like. A fluid other than air may be used if desired. The fluid supply 232 is regulated by a fluid supply controller 234 activating pressure control valves feeding inlets 214 and 216. The piston 220 is magnetically coupled to an outer carriage 240 that slides along the exterior 222 of the cylinder 210 in response to the presence of fluid within the interior 230 by virtue of the magnetic coupling to the piston 220. A laser 250 read by a laser controller 252 is optically bonded to the first end 212 of the cylinder 210, where the first end 212 of the cylinder 210 comprises a lens 213 formed from an optically transmissive material such as Plexiglas (trademark) or the like. In some embodiments the laser controller 252 is the same controller as the fluid supply controller 234. In other embodiments, the controllers are housed in the same unit or are fully independent. One or both of the controllers may contain a processor for processing information, a memory for storing reference information, an interface for receiving and/or transmitting reference information, data, and/or commands, and the like. The memory may store, for example indications of the contour of a vehicle, reference information from the laser 250, a set of correlations between a specified vehicle contour and expected reference information based on that vehicle contour, as well as other information for processing, such as a conversion engine for converting vehicle contour data into required locations of the secondary pneumatic actuator 200.

Although the embodiment shows a lens 213 formed from Plexiglas (trademark), other light transmissive lens materials may be used. The laser 250 emits a beam 254 that reflects off the piston 220 to accurately determine the position of the piston 220, and therefore the carriage 240, relative to the first end 212 of the cylinder 210. The position of the carriage 240 may be controlled by laser tracking the piston 220 using a closed loop control system using feedback from the laser 250 to regulate the fluid supply 232 within the interior 230 through the inlets 214 and 216.

Figure 9A:
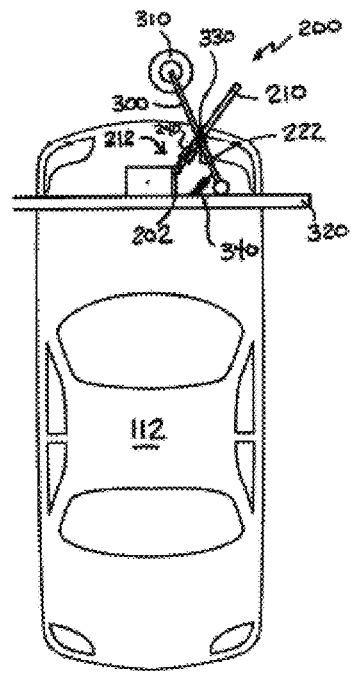
FIGS. 9A through 9C illustrate a top plan view of a partial schematic of one embodiment of a vehicle wash system, in accordance with one or more embodiments of the present disclosure.
Figure 9B:
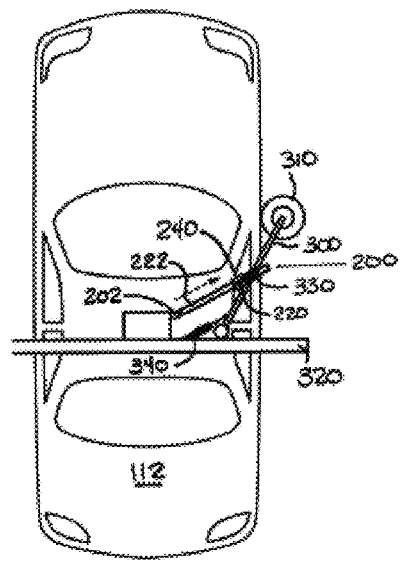

As shown in the embodiment of FIG. 9A, a vehicle 112 approaches the cleaning wrap 310, and a mechanical arm 300 is initially positioned relative to a vehicle 112 by a primary pneumatic actuator 340 attached to the arm support 320 that functions independent of the secondary pneumatic actuator 200 even though the pneumatic actuators 200 and 340 are associated through the movable guide 330. In one embodiment, the primary pneumatic actuator 340 is a traditional piston-cylinder that applies a controlled amount of force against the mechanical arm 300 to position the cleaning wrap 310 relative to the vehicle 112 based on vehicle parameters. The primary pneumatic actuator 340 may also be a rodless air cylinder as described in connection with the secondary pneumatic actuator 200, or another functionally equivalent structure. FIG. 9B shows the vehicle 112 of FIG. 9A having advanced forward relative to the cleaning wrap 310 now having its side cleaned by the cleaning wrap 310, wherein the mechanical arm 300 is extended further under control by the primary pneumatic actuator 340 and the carriage 240 is moved by the piston 220 under laser guidance to impact the movable guide 330 and thereby assist in the positioning of the mechanical arm 300 and the cleaning wrap 310 relative to the side of the vehicle 112.

More specifically, the carriage 240, when the secondary pneumatic actuator 200 is activated, functions as a mechanical stop for the mechanical arm 300 in order to hold the mechanical arm 300 and the cleaning wrap 310 at a predetermined distance away from the vehicle 112 based on the vehicle contour and relative to the side of the vehicle 112 in order to maximize the cleaning effectiveness of the cleaning tips of the cleaning wrap 310 relative to the vehicle surface. In the embodiment shown, the secondary pneumatic actuator 200 maintains a minimum distance between a portion of the cleaning wrap 310 and the side of the vehicle 112. Thus, for example, the carriage 240 prevents the cleaning wrap 310 from being drawn toward the vehicle 112 by certain vehicle contours like a wheel well or the like, whereupon exiting the wheel well would cause the cleaning wrap 310 to be positioned too close to the side of the vehicle 112 and, for example, impact the side of the vehicle potentially causing damage to the vehicle and negatively impacting the customer experience.

Furthermore, the carriage 240 acting as a mechanical stop may also act as a safety feature because the positioning of the carriage 240 can be effectively locked in place through the operation of the pressure control valves feeding inlets 214 and 216 if power is lost, thereby retaining the mechanical arm 300 away from the vehicle 112. Thus, the secondary pneumatic actuator 200 functions to prevent inward movement of the mechanical arm 300 while the cleaning wrap 310 cleans a side of the vehicle 112.

Figure 9C:
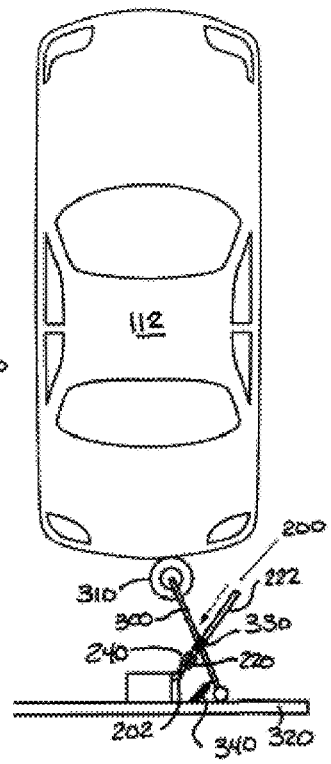
Figure 9D:
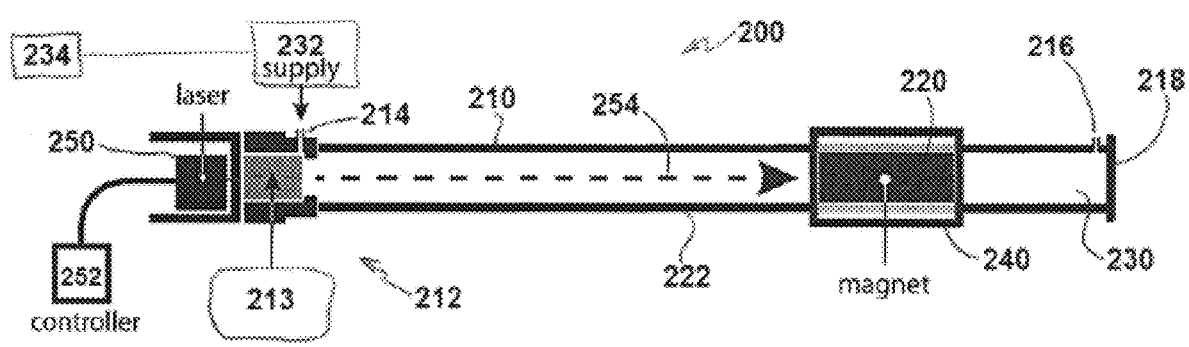
FIG. 9D illustrates one embodiment of a pneumatic used in the embodiments of FIGS. 9A through 9C of a vehicle wash system, in accordance with one or more embodiments of the present disclosure.

Once the cleaning wrap 310 passes the rear wheel of the vehicle 112 and before the rear of the vehicle 112 is reached, as shown in FIG. 9C, the carriage 240 is retracted along the cylinder 210, potentially still under laser guidance, away from the movable guide 330 and the mechanical arm 300 may then move under guidance from the primary pneumatic actuator 340 to position the cleaning wrap 310 across the rear bumper of the vehicle 112.

In some embodiments, the pneumatic system depicted in FIGS. 9A-D acquires data from at least one sensor for sensing the distance between a known location and a side of the vehicle 112. The at least one sensor may be two sensors located at different heights to assess the side profile of the vehicle 112. In using data from such sensors, the system may use only the "outermost" data points out of the two sets of data, or the data points indicating a wider vehicle.

Figure 10A:
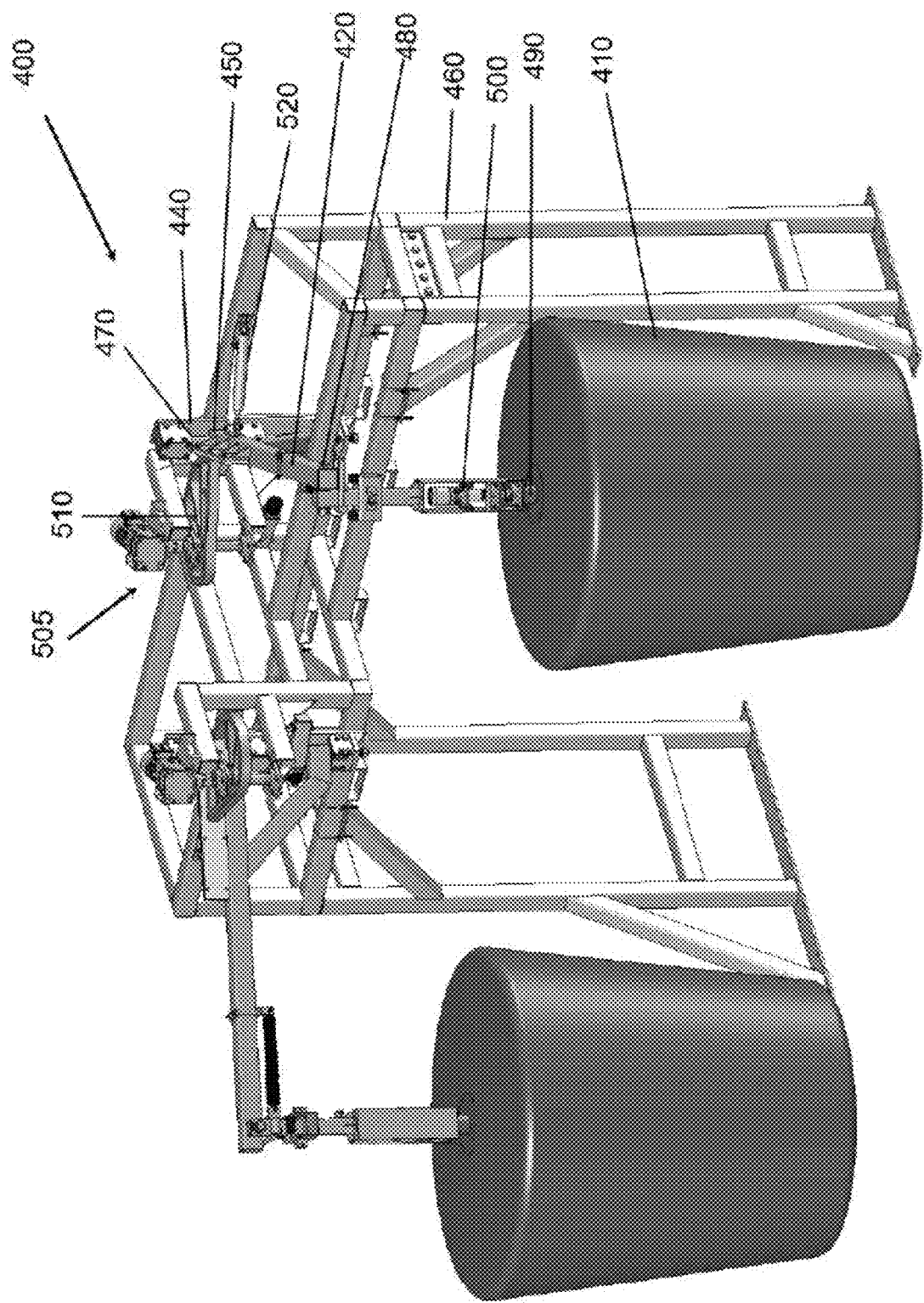
FIG. 10A illustrates a perspective view of one embodiment of a wash equipment assembly for use in a vehicle wash system, in accordance with one or more embodiments of the present disclosure.
Figure 10B:
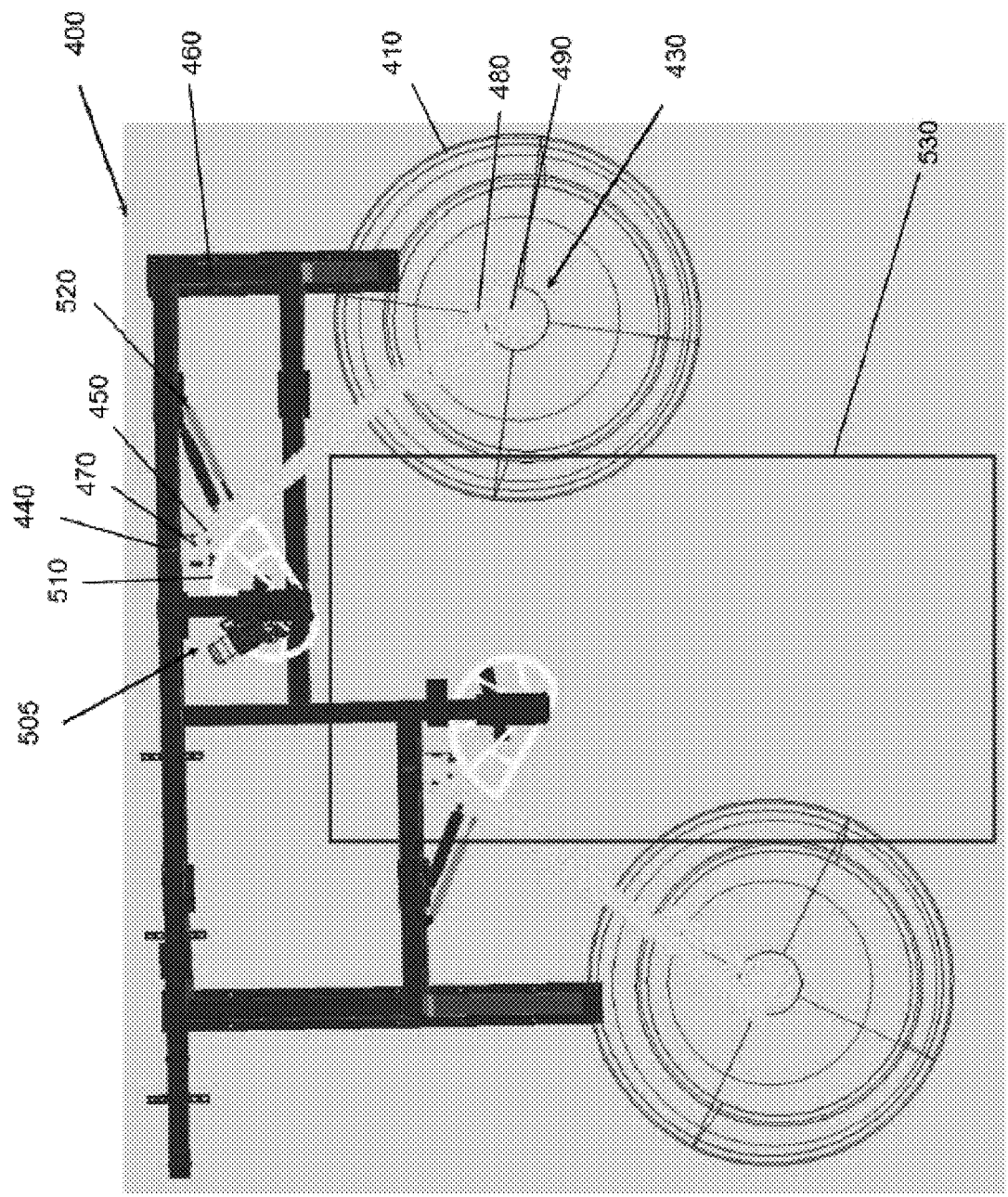
FIG. 10B illustrates a top view of the wash equipment assembly of FIG. 10B, in accordance with one or more embodiments of the present disclosure.
Figure 11:
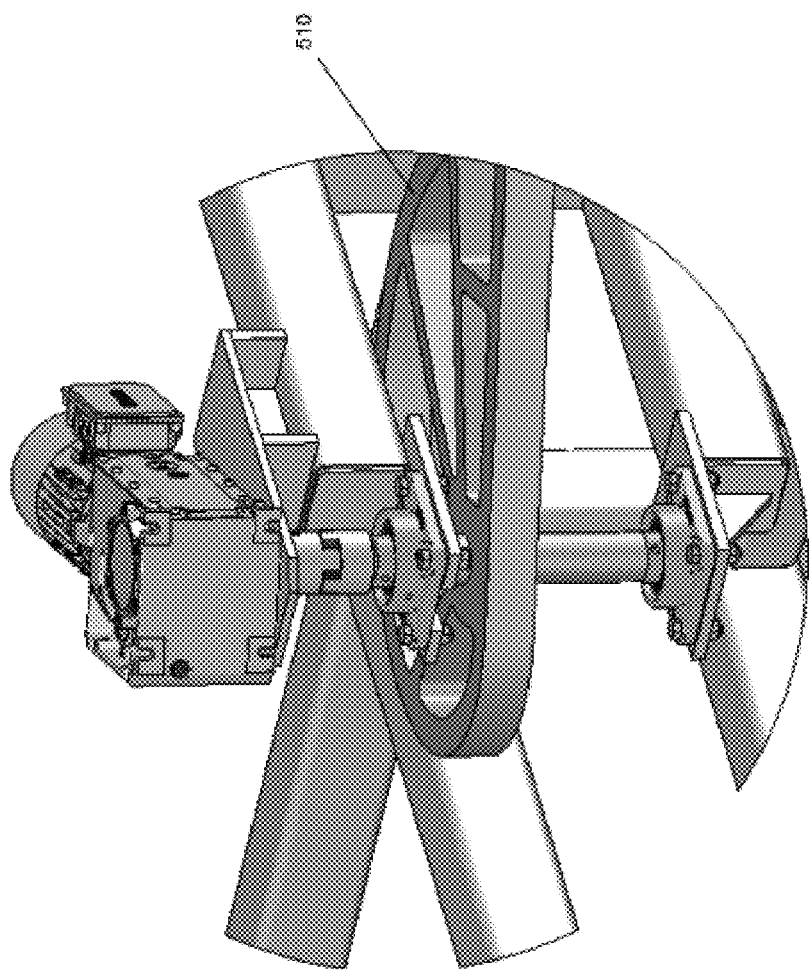
FIG. 11 provides a detail view of a cam surface of the wash equipment assembly shown in FIG. 10, in accordance with one or more embodiments of the present disclosure.
Figure 12A:
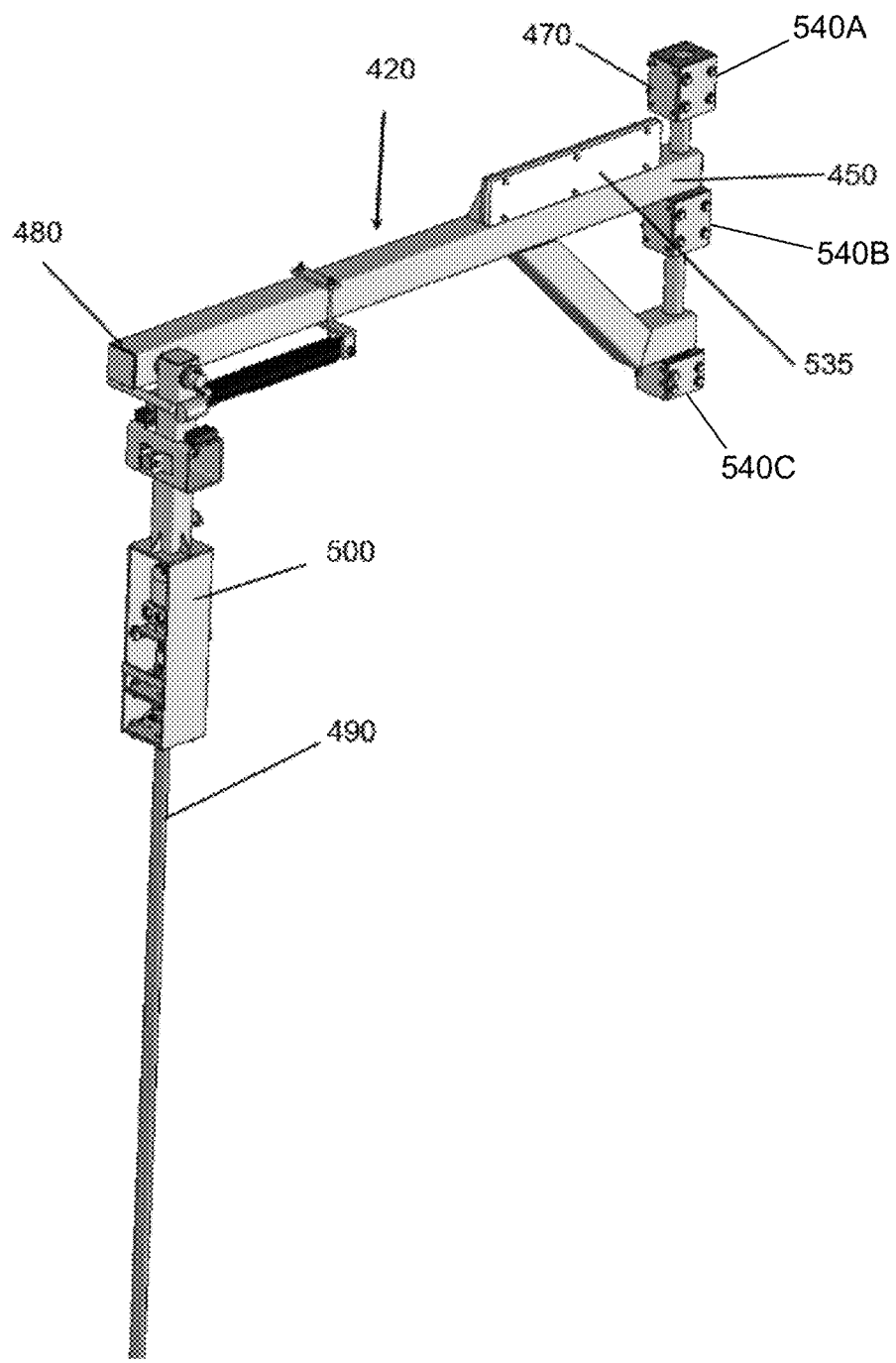
FIGS. 12A and 12B illustrate an arm and sensor assembly for use with the wash equipment assembly of FIG. 10, in accordance with one or more embodiments of the present disclosure.
Figure 12B:
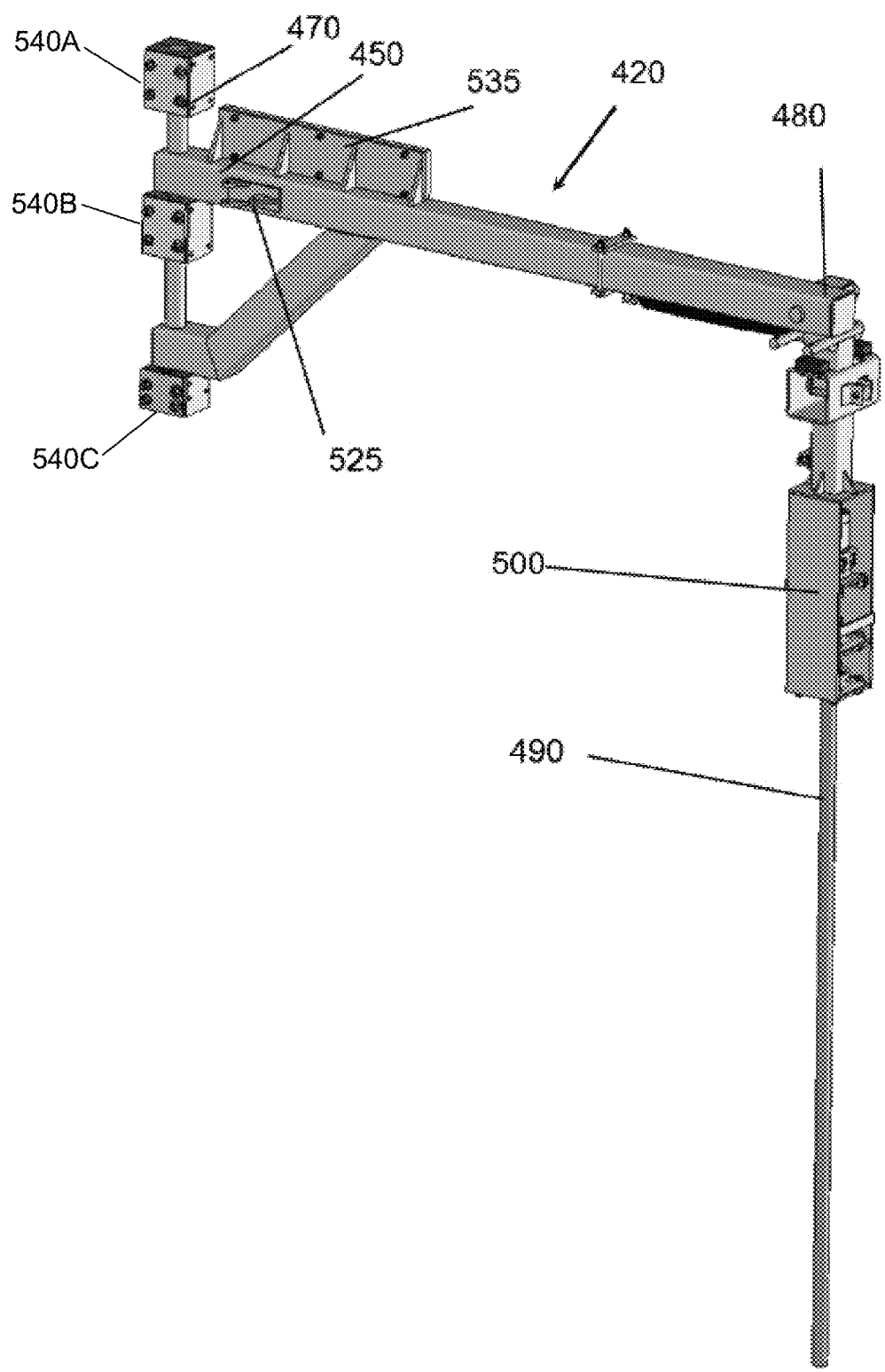

FIGS. 10A and 10B illustrate one embodiment of a wash equipment assembly 400 for use in a vehicle wash system, with FIG. 10a showing a perspective view and FIG. 10B showing a top view. FIG. 11 shows a close-up view of a cam surface 510 of the wash assembly of FIGS. 10A and 10B. FIGS. 12A and 12B illustrate an arm and sensor assembly for use with the wash equipment assembly of FIG. 10.

As shown, the wash equipment assembly 400 comprises at least one cleaning element 410 for cleaning a vehicle and an arm 420 for holding the cleaning element 410 and moving it to a vehicle cleaning position 430. The cleaning element 410 is typically a spinning brush or wrap designed to clean a side, front, or rear surface of a vehicle. When the cleaning element 410 is brought to the vehicle cleaning position 430, it comes in contact with a vehicle in the vehicle wash system, and typically leans against the vehicle, such that a vertical axis 490 of the cleaning element 410 is pushed away from true, or plumb, vertical.

The arm 420 is movably fixed to a support 440 at a first end 450. In some embodiments, the arm 420 is fixed to a framework 460 or scaffolding for supporting wash equipment. This fixation may be, for example, at a rotating hinge 470 or a different type of sliding or rotating connection.

The cleaning element 410 may be mounted on the arm 420 at its second end 480. As shown, the mounting of the cleaning element 410 may be by hanging the element from the second end of the arm 420. In such an embodiment, when not in use, the cleaning element 410 may hang from the second end 480 of the arm 420, such that the vertical axis 490 of the wash equipment may hang along a vertical plumb line. A sensor 500 is provided at the vertical axis 490 of the wash equipment 410 in order to determine an angle of the vertical axis relative to the plumb vertical at any given time. The sensor 500 may be, for example, an inclinometer or an accelerometer, or any other sensor for determining an orientation of the axis of the wash equipment 410.

It should be noted that, in certain implementations, each arm 420 of the wash equipment assembly 400 (i.e., the right arm and the left arm) can be equal in length. In such an arrangement, when not in use, the arms 420 can return to an initial or rest position such that the cleaning elements 410 are arranged in line or essentially in line with each other. Such an arrangement provides for an implementation where each side of the wash assembly 400 can be similarly timed for movement and moved in a sequential pattern. Such an arrangement also can provide for overlap at the front of the vehicle and the back of the vehicle, increasing the likelihood that the center of the front and back of the vehicle will be thoroughly cleaned. This is in contrast to wash assemblies having different length arms that travel different paths and patterns and provide no overlap at the front and backs of vehicles.

Referring again to FIGS. 10A and 10B, an actuator system 505 controlled by a controller is provided for positioning the cleaning element 410 relative to a vehicle in a car wash. In some embodiments, the actuator system utilizes a controlled locator 510 and a primary actuator 520, such as a piston based actuator, for positioning the arm 420 relative to the support 440 and for moving the cleaning element 410 to the vehicle cleaning position 430. In some embodiments, the primary actuator 520 is connected to a fixation location 525 on the arm 420, and applies a force to the arm to move the cleaning element towards an expected vehicle location 530, and the controlled locator 510 opposes the force applied by the primary actuator 520 at a surface 535 incorporated into or adjacent the arm 420. The force from the primary actuator 520 may be constantly applied, and the controlled locator 510 may be an adjustable stopper for setting a minimum distance between the cleaning element 410 and an expected vehicle location 530 or an actual vehicle location. In certain implementations, by providing opposing forces the car wash can be configured such that the cleaning element 410 can only move away from the vehicle. In the event of a malfunction, the cleaning element 41o can mechanically move away from the vehicle by overcoming the pressure being exerted by the primary actuator 520. Such an arrangement can prevent damage to a vehicle (by being positioned too close to the vehicle) while avoiding not properly washing the car (by being positioned too far away from the vehicle).

As shown in FIGS. 10A and 10B, the controlled locator may be, for example, a cam surface 510 that is rotated to increase or decrease the minimum distance. Other adjustable stoppers may be used as well, such as a mechanical stop for a piston, or a piston implementing such a mechanical stop, including those described above with respect to FIGS. 9A-9D.

The vehicle cleaning position 430 is adjacent an expected vehicle location 530 and corresponds to the location that a vehicle being cleaned in the wash equipment assembly is expected to occupy. Typically, when the vehicle being cleaned is in the expected vehicle location 530, the cleaning element 410 contacts the vehicle and is thereby prevented from hanging vertically. Accordingly, the distance between the vehicle cleaning positon 430 and the expected vehicle location 530 in a radial direction from the cleaning element 410 is less than a radius of the cleaning element 410. The difference between this distance and the radius of the cleaning element 410 is referred to herein as an amount of washer penetration on the vehicle.

The amount of washer penetration on the vehicle is typically selected such that when the cleaning element 410 is in contact with a vehicle, the vertical axis 490 of the cleaning element 410 is offset a specified amount from plumb vertical. Such an offset insures that an appropriate amount of pressure is being applied to the vehicle by the cleaning element 410. For example, a particular implementation may target four inches of washer penetration on the vehicle, and an optimal angle of the cleaning element 410 for such an implementation may be a three degree angle from vertical. In such an embodiment, if the sensor 500 indicates that the angle of the cleaning element 410 is significantly greater than expected orientation of a three degree angle from vertical, it would indicate that the vehicle is not at the expected vehicle location and is instead closer to the vehicle cleaning position. That, in turn, would indicate that the washer penetration is greater than the targeted four inches. In such an example, the controller can therefore rotate the cam surface 510 to increase the distance between the vehicle cleaning position 430 and the expected vehicle location 530 to account for the offset between the expected vehicle location and an actual vehicle location. The controller can continually measure the output of the sensor 500 until the angle of the cleaning element 410 returns to the optimal angle, e.g., three degrees from vertical.

Similarly, if the sensor 500 indicates that the angle of the cleaning element 410 is significantly smaller than the expected three degrees, such as only one degree, it would indicate that the vehicle is farther from the vehicle cleaning position than expected, and the controller would then rotate the cam surface 510 to decrease the distance between the vehicle cleaning position 430 and the expected vehicle location to account for the offset. By monitoring the sensor 500, the controller can account for any offset from an ideal angle of the cleaning element 410 throughout a cleaning process.

The described assembly and a system using the assembly is useful throughout a wash process to account for a vehicle that is closer or farther from the wash equipment than expected. Further, the described system may be utilized to prevent damage to protrusions from the side of a vehicle. For example, when a cleaning element 410 comes in contact with a mirror of a vehicle, the angle indicated by the sensor 500 would immediately increase resulting in the controller rotating the cam surface 510 to force the cleaning element 410 away from the vehicle, thereby preventing damage to the mirror. Once the cleaning element 410 passes the mirror, the vertical axis 490 will decrease and the controller can rotate the cam surface 510 to move the cleaning element back into contact with the vehicle and restore the ideal amount of washer penetration.

Similarly, the described system may implement an emergency stop process by monitoring the difference between the ideal angle and the actual angle indicated by the sensor 500. If the difference exceeds a set threshold, the system may stop a wash process in order to avoid damaging a vehicle. For example, if an ideal angle is three degrees, as described above, and expected variations may result in angles up to six degrees during normal operations, a threshold may be set at 10 degrees such that the system is stopped and the reason for such an extreme angle may be investigated. This may be, for example, after the cleaning of the front of the vehicle if the cleaning element 410 has not properly moved to the side of the vehicle.

Further, the sensor 500 may be used to monitor a wash process more generally to confirm that the process has adequately washed a vehicle. Accordingly, data provided by the sensor 500 may be monitored or recorded over the course of a wash process, and may be compared with an expected data signature for the vehicle being washed. If the actual angle is consistently different than the ideal angle, or if the angle differs at specific times within the wash process, an alert may be sent indicating that the wash may not have been adequate.

In some embodiments, only specific parts of the process are checked for adequate washing. For example, the washing of the front and rear of the vehicle may be checked to confirm that the cleaning element 410 was properly in contact with the vehicle during that time. For example, the sensor 500 may be a two axis inclinometer, monitoring an X-axis, generally in the direction of travel of the vehicle, and a Y-axis, generally perpendicular to the direction of travel of the vehicle. The X-axis may be used to evaluate contact of the cleaning element 410 with the front or the rear of the vehicle, while the Y-axis may be used to evaluate contact with the side of the vehicle. Accordingly, if the X-axis shows a zero angle during the cleaning of the rear of the vehicle, such a read out indicates that the cleaning element 410 did not contact the vehicle during that time.

In some embodiments, the expected vehicle location 530 may be defined by a control system for the wash equipment assembly 400, and may be based on a vehicle profile, as discussed in detail above. Such a vehicle profile may be acquired in a car wash including the wash equipment assembly 400, or it may be based on a database accessed by the system.

Throughout the lifetime of a car wash assembly, such as car wash assembly 400, routine maintenance may need to be performed on various components. For example, various components on arm 420 may need to be repaired and/or replaced. One component that can potentially fail is hinge 470. In traditional car wash assemblies, the hinge include one or two pillow block bearing assemblies that are typically replaced after a particular number of hours of operation. In traditional assembly, replacement of the bearing requires removal of the wash arm and replacement of the bearing assembly. Such a process can take a number of man hours (e.g., three people working 6-8 hours each for a total of 18-24 man hours per wash arm) during which the car wash system is unable to function. This process is then repeated for the other arm. Thus, replacing bearing assemblies in traditional car wash systems can result in considerable downtime.

As shown, for example, in FIG. 12A, the car wash assembly 400 as described herein can include a three bearing assembly on hinge 470, including bearings 540A, 540B, and 540C. As provided, such an arrangement of bearings provides for removal and replacement of each of the bearings without removal of arm 420, thereby greatly reducing the amount of downtime as compared to a one or two bearing assembly. For example, when removing top bearing 540A, the weight of the arm 420 is supported by both bearings 540B and 540C. During removal of middle bearing 540B, the weight of the arm 420 is supported by bearing 540C. During removal of bottom bearing 540C, the weight of the arm 420 is supported by bearing 540B. As such, a three bearing arrangement as described herein provides for a more efficient process for replacing bearing components of hinge 470.

Figure 13:
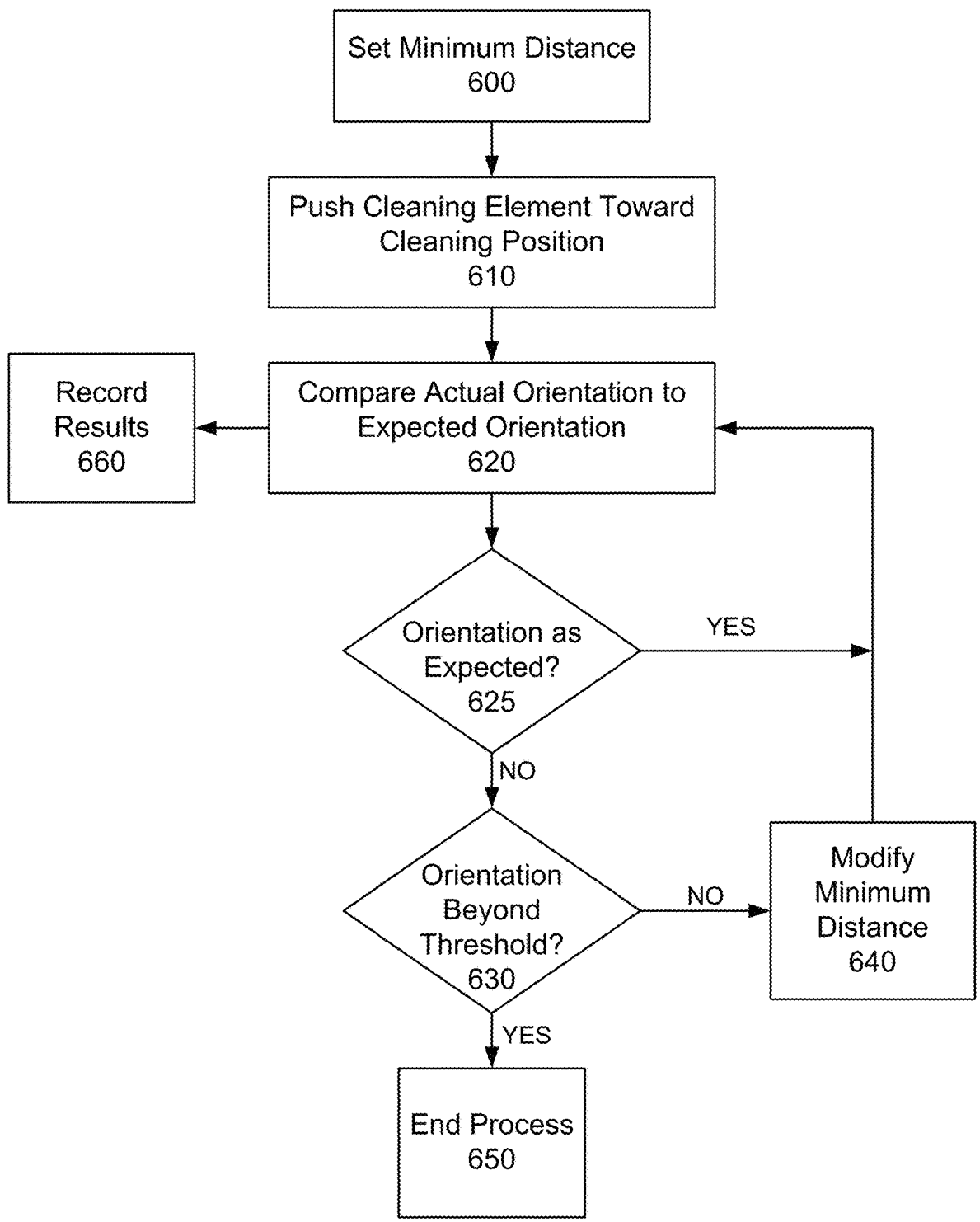
FIG. 13 depicts a flowchart illustrating a method for using a wash equipment assembly in a car wash system, in accordance with one or more embodiments of the present disclosure.

FIG. 13 is a flowchart illustrating a process for using the wash equipment assembly 400 in a car wash system. The wash equipment assembly 400 may set 600 a minimum distance between an expected vehicle location 530 and a vehicle cleaning position 430. The vehicle cleaning position 430 is a target initial location for the cleaning element 410 during a cleaning process. The expected vehicle location 530 may be set as an initial default location, or it may be determined based on a particular vehicle being washed. For example, the expected vehicle location 530 can be determined when the vehicle initially enters the scanning arch 118 as described above. In some embodiments, a profile of the vehicle is evaluated, as discussed above, and the expected vehicle location 530 is set based on that profile.

The distance from where the car is initially measured to when the vehicle first encounters a cleaning or wash element (e.g., cleaning element 410) can be used to determine a start time or a time when the cleaning element is activated. As further shown in FIG. 13, the primary actuator 520 may then push 610 the arm 420 of the assembly 400 based upon the determined start time such that the cleaning element 410 moves towards the cleaning position 430 into position for the vehicle to be washed, and the controlled locator 510 may prevent the arm from moving any further once the cleaning element is in place. The controlled locator 510 thereby sets a minimum distance between the cleaning position 430 and an expected vehicle location 530.

The system then compare 620 the actual orientation of the cleaning element 410 against an expected orientation of the cleaning element. The system can then determine 625 if the measured orientation is as expected. If the orientation is as expected, the system can continue to compare 620 the actual orientation against the expected orientation. If the system determines 625 that the orientation is not as expected, the system can determine 630 if the orientation is beyond a particular threshold.

For example, as noted above, the sensor 500 can be implemented as an inclinometer configured to measure an angle of cleaning element 410 from vertical. If the sensor 500 measures the angle is higher than an expected threshold (e.g., three degrees from vertical), the system can modify 640 the minimum distance between the cleaning position 430 and the expected vehicle location 530 by adjusting the controlled locator 510, such as the cam surface shown in FIG. 11.

In some embodiments, if the sensor 500 shows an actual orientation different than the expected orientation, and the system does determine 630 that the difference is greater than a threshold amount, the system may stop 650 the wash process.

In some implementations, the system may record 600 the output of the sensor 500 over the course of a wash process. In such an embodiment, they system may then compare that output to an expected output to determine if a wash process was adequately implemented. If the system determines that the wash process was inadequate, it may then alert a user or provide some other type of feedback.

The process as shown in FIG. 13 provides for a closed loop control of the positioning of the cleaning elements as described herein. For example, by measuring position information and providing updated measurement information to the system controller, the system controller can continually adjust for vehicle drift in the car wash without concern for damage to the vehicle of the cleaning elements. Additionally, as shown in FIG. 13, by providing constant monitoring of the orientation of the cleaning elements (e.g., via an inclinometer mounted adjacent to the cleaning element) the wash process can be stopped if any cleaning elements exceed an orientation threshold. Such an occurrence can be indicative that the vehicle and/or cleaning elements are in a position that may cause damage and the safest action is to stop the wash process.

In certain embodiments, closed loop control may be applied in many situations beyond washer positioning as described above. For example, in certain implementations a high pressure pump usually does not have to be run at full RPM and pressure; in most cases excess energy is consumed and the extra pressurized water is bypassed back to a storage tank. With a variable frequency drive, the system 110 may operate the pump at the RPM required to drive a specific piece of wash equipment, such as cleaning wrap 310, rather than have a set value that may not clean the vehicle 112 sufficiently or may waste resources.

The system may further manipulate the data to eliminate noise in the data used for both controlling the positioning of the wrap 310 and any other parameters of the wraps usage by, for example, filtering the data. The sensors, along with one or more processors integrated with controllers 234 and 252, may then record data incrementally in order to record a sequenced side profile of the vehicle 112 as the vehicle passes the sensors on, for example, a conveyor. A control system implemented in the controllers 234 and 252 may then use the data collected to set a desired position for each data point along the vehicle profile using variables such as the diameter of the wrap material, the desired amount of contact length of wrap material with the vehicle 112, and mechanical translations of a measured position of the cylinder of the wrap 310 as it relates to the position of a defined zero position of the wrap.

In some implementations, the sequenced side profile data for the vehicle 112 may be used to look ahead and adjust, for example, the secondary pneumatic actuator in advance to prepare the positioning of the wrap 310 for an upcoming portion of the profile. Adjustments may incorporate, for example, expected velocity of the vehicle based on a conveyor speed. The system may then generate an expected instantaneous piston location and use a feedback loop incorporating to minimize the error between the actual piston location and the expected piston location. For example, in a sample implementation, the system can use a dynamic measuring device such as laser 250 to generate location information.

Closed loop control may also include full wash diagnostics. For example, by monitoring the wash equipment 114 a user may be able to confirm that everything is in the proper position. In one embodiment, the vehicle wash system 110 may be monitored remotely via a telephone or computer. In one embodiment, the vehicle wash system 110 alerts the user of any potential problems (e.g., worn nozzle 114d, jammed brush or wrap 114b or low quantity of soap remaining) and the user may stop the wash or continue washing with an email, call or text alert to others depending on the severity of the issue. In certain implementations, with a closed loop system utilizing a pressure transducer, the system may determine whether a nozzle 114d is clogged and needs to be cleaned or if the nozzle 114d is worn and needs to be replaced. Since the system 110 may monitor all the equipment 114, the system 110 may also provide maintenance intervals or reminders for proper service.

Exemplary chemical applicators provide wash solutions on the driver and passenger sides, and top of the vehicle 112. In some embodiments, the top of the vertical chemical applicator arch provides solutions on the horizontal surfaces. The horizontal chemical manifold (not shown), may apply chemical to the horizontal vehicle surfaces. On the hood and trunk of most vehicles the top portion of the side applicators apply additional product on the horizontal surfaces. This may result in a waste of water, sewer and chemical during the application cycle but also requires created additional water and sewer costs to fully rinse the vehicle. In one embodiment, by determining the vehicle height, the system 110 can activate higher vertical side arches 114ab when the vehicle height indicates that the applicator 114ab should be on. In some embodiments, solution application will be more targeted and result in lower operating costs and improved performance.

Figure 5:
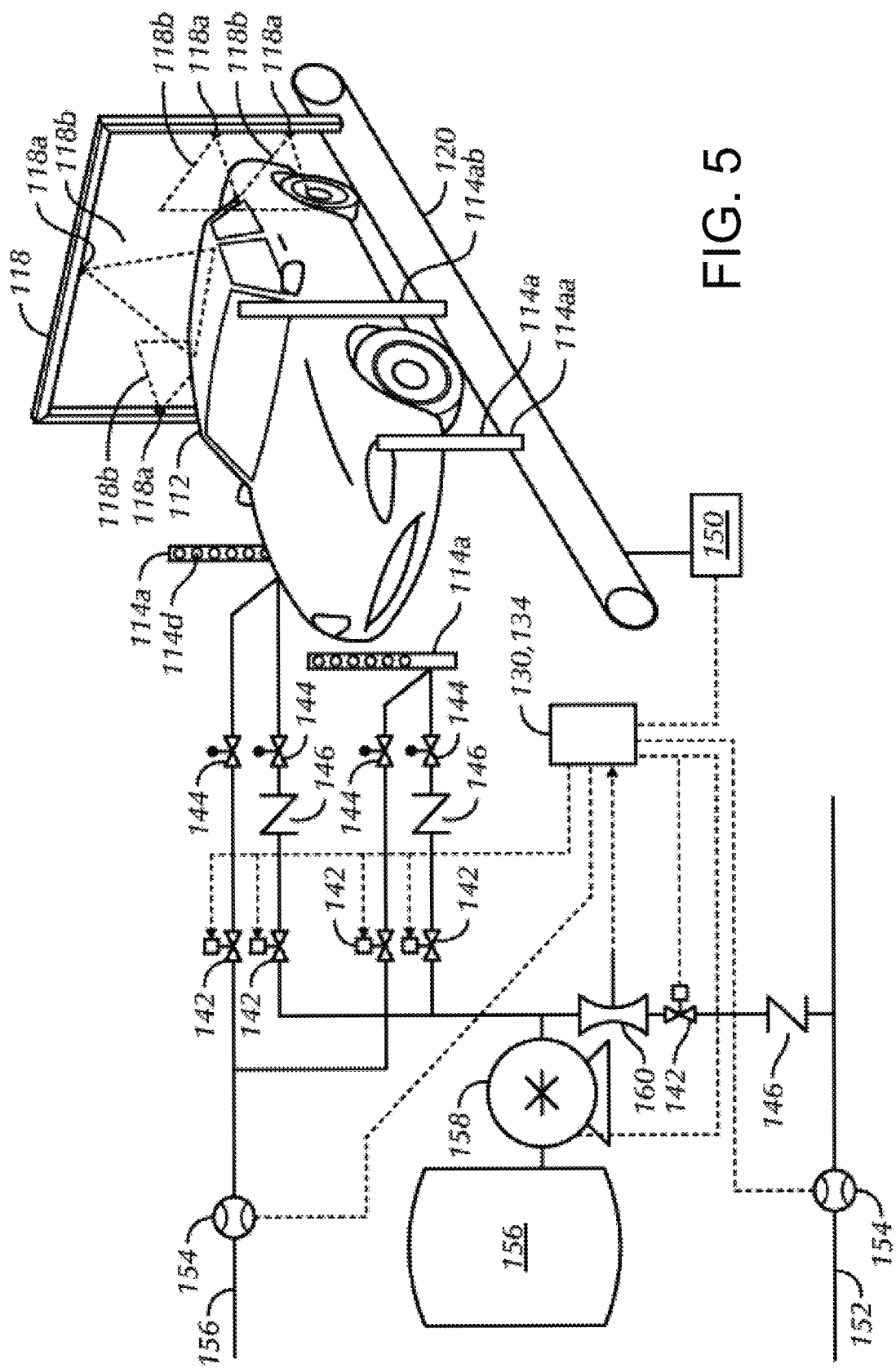
FIG. 5 is a schematic of a chemical application system in accordance with one or more embodiments of the present disclosure.

Referring to FIGS. 1 and 5, the vehicle wash system 110 may adjust the application of chemicals based on the measured height of the vehicle 112. In one embodiment, the chemical application management system addresses at least four (4) issues related to cost-effective application of chemicals during the carwash process: 1) Proper metering or dilution of chemicals; 2) More precise application of wash solutions in the vertical plane (vehicle sides); 3) Varying volumes of product applied to targeted parts of the vehicle 112; and/or 4) Self-diagnosis of the chemical mixing and application system integrity, such as plugged nozzles 114d or a significant leak or line break.

The first three cost effective applications of chemical issues above may occur because of both a) changes in vehicle profile, and b) changes in conveyor speed in response to customer demand. Existing fixed application sprayers have a single ideal conveyor speed, and will under/over apply chemicals if conveyor speed is increased/decreased. In addition, although the lower body section of a vehicle (below the windows) usually needs a heavier and continuous application of chemicals. A lighter application is appropriate for the higher side sections, where overspray is wasteful and requires additional rinsing to remove; this results in additional water, sewer and chemical costs. By splitting the vertical plane into two or more segments (e.g., two chemical arches 114aa, 114ab) and utilizing feedback flow control as described in the exemplary embodiments above, chemicals may be optimally blended and more precisely applied to only those surfaces presenting themselves in the spray zone.

The final cost-effective application of chemical issues above may be managed by monitoring valve position as well as liquid and air flow. Although the feedback control system may adjust flows as needed to apply the right amount of chemicals to each applicator zone, the correct valve position required to do so will vary depending upon mechanical abnormalities in the system. For example, a valve 114d may move to a more open position when a system leak occurs to maintain flow; a partially plugged nozzle 114d will cause less flow or gpm to an arch 114a, and cause the valve to move to a more closed position to maintain the correct flow rates to the other nozzles 114d. In any of these situations, improper chemical application may occur, leading to poor results and/or higher operating costs. Through early detection, repairs can be made to correct the problems before a significant deterioration in performance occurs.

In one embodiment, application of chemicals may be managed by volumetric mixing of chemicals and water so as to create the correct dilution of product. With volumetric mixing, it is only necessary to monitor flow for fixed rate applications. Pressure and flow are required to provide more or less solution based on changing vehicle sizes and/or conveyor speed.

In one embodiment, the chemical arches 114a include a split applicator system with separate feeds to the top and bottom 114aa, 114ab (or as many zones as deemed necessary) of the vertically mounted nozzle assemblies 114a as shown. The spray assemblies 114a may consist of manifolds with multiple nozzles 114d one more than one chemical arch 114a, and/or a movable single nozzle (not shown) that can direct spray within a predefined angle at the top and bottom of the target surface. Additional manifolds may be used based on the distance from the spray manifold to the vehicle 112. In one embodiment, valves 142 are used to control flow of liquid and air to each assembly 114a as required for the specific vehicle profile. In one embodiment, feedback control loops measure liquid and air pressure, along with their respective flow rates. In one embodiment, manual flow valves 144 are provided for manual adjustment and/or override. In one embodiment, there are check valves 146 to ensure one way flow through the valve lines. In one embodiment, there is one or more controllers 130, 134 that control the valves 142. In one embodiment, there is a conveyor speed sensor 150 to measure the speed of the conveyor 120. In one embodiment, the main water supply 152 and main air regulated air supply 156 each include a pressure sensor 154. In one embodiment, the chemical tank 156 is in fluid communication with a metering pump 158 and a flow sensor 160.

In one embodiment, four measurements are used to manage chemical application: 1) Flow rate of primary water feed 152; 2) Water pressure 3) Chemical feed pump rate for optimal dilution; and/or 4) Measured/monitored valve positions to regulate primary water and air flows.

The desired flow of water may be determined by the conveyor speed and vehicle profile to which chemicals will be applied. This water flow defines the chemical injection pump speed and foaming air flow. In one embodiment, if flow to the upper spray nozzle assembly 114ab is intentionally interrupted for a segment of the vehicle profile, the lower assembly 114aa remains active and the total water flow will be reduced proportionately. When the upper assembly 114ab is reactivated, the total chemical flow will increase accordingly. In one embodiment, if the conveyor speed is increased or decreased, the water flow and all other feeds will be adjusted accordingly. During normal operation, valve positions on both the water and air feeds may be tracked against expected known valve positions for the full range of operating conditions. When a deviation is encountered, an appropriate alert may be sent to signal operating personnel.

A number of benefits from this improved system 110 may be achieved.

More precise application to active profile surfaces of a vehicle 112 may result in less waste as product is applied in targeted areas; additional savings in water, sewer and chemical as overspray does not negatively impact other unwanted areas; and/or different amounts of product for the different parts of the vehicle 112 improves wash performance.

Early detection of mechanical malfunctions that prevent the proper application of chemicals to a vehicle 112, to provide repeatable quality and save vehicles 112 from possible damage from misapplication of chemicals.

Optimum chemicals usage contributes to achieve cost-effective and environmentally sensitive results and a better experience for the customer.

With the addition of a closed loop speed control component, there is an additional benefit from automatic adjustment of chemical usage in proportion to conveyor speed (neither under nor over application of chemicals as conveyor speed changes). This further reduces the chance for operator errors, and increases the wash quality consistency.

By adding the split chemical applicator 114a in conjunction with the controller 122, chemical usage can be optimized and costs reduced. The prioritization of starting motors as described below may provide additional utility savings without impacting wash quality.

The following example is provided as illustration of one embodiment of system 110. In one exemplary use, the customer in their vehicle 112 approaches the kiosk 116. In one embodiment, the kiosk 116 provides a greeting and introductory video clip, with audio, explaining new services, wash equipment and/or promotions. In one embodiment, the customer makes a wash selection, the system plays an upgrade video, and the customer may select or decline the upgrade. In one embodiment, payment is made and the transaction finalized. In one embodiment, a computer controlled gate in front of the terminal opens to allow the paid vehicle access to the wash. In one embodiment, the computer 122 controls the order cars are stacked into a vehicle queue to enter the wash process. In one embodiment, there may be two or more payment kiosks 116 with gates are 4-6 vehicles back from the entrance of the tunnel to allow a buffer between cars and the wash. For example, if a slow customer ties up a lane, the other lane, plus the queued cars, ensures that tunnel volume will remain uninterrupted.

In one embodiment, as a vehicle 112 enters the drive on area of the conveyor 120, a sensor counts tire activations from a treadle. In one embodiment, once the rear tire clears the roller up trap door, the entrance sign is fired. The sign may instruct the customer to place the car in neutral, and not to steer or use the brake. In one embodiment, an attendant is present to ensure the customer can drive onto the conveyor 120 and complies with the instructional sign. In one embodiment, after a user programmable delay, a roller up cylinder on the conveyor 120 is activated and a roller, behind the rear driver tire, starts to push the vehicle through the wash.

In one embodiment, once on the conveyor 120, the first piece of equipment the vehicle 112 passes through is the scanning arch 118. In one embodiment, there is a gate switch 162 to measure the length of the vehicle and a tire switch to measure the position of the tires relative to the vehicle. In one embodiment, as the vehicle passes through the arch, scans measuring each vehicle surface are performed at fixed intervals of chain movement, and therefore, vehicle travel. In one embodiment, the scanned profile of the vehicle 112 is read by the controller 122 from the scanning arch 118 as described above and then streamed to secondary devices which control the respective equipment 114 to position equipment for the size and shape (profile) of the specific vehicle 112 being washed. In one embodiment, the RPM of the brushes or wraps 114b will also be adjusted for the profile of the vehicle based on the position of the washer on the vehicle. In one embodiment, front, sides, rear and top surfaces require different RPMs of the wash equipment to prevent damage, improve cleaning and create a better customer experience. Additionally, in one embodiment, RPM and position may need to be adjusted on a single surface such as moving out and slowing down around side mirrors that protrude past a certain measurement. In one embodiment, the scanning takes place before the first piece of equipment in the wash process so each piece of equipment can receive the benefit of the vehicle profile information. In one embodiment, the sensors 118a are placed in a less hostile environment than in the middle of the wash equipment. Sensors may fail and misread in the wash area. Adding sensors to each piece of wash equipment may be expensive and unreliable.

In one embodiment, after scanning the profile, the vehicle 112 would enter the presoak area. Presoak is an alkaline chemical effective against road films and organic dirts. The presoak may emulsify materials on the painted surface, breaking the bond between the vehicles surface. Chemical application is usually provided by a single arch that has a vertical manifold or applicator on each side of the vehicle, spraying the sides, and a horizontal manifold above the vehicle to spray the top or horizontal surfaces. Chemical, water and sewer costs may be increased by allowing chemical to spray from the upper vertical side applicators onto the horizontal surfaces. Such over application of chemical is wasteful and counterproductive to the wash process. Over application of chemical on the horizontal surfaces require more acidic wash solution (and rinse water and sewer) to neutralize the alkalinity in order to get a shiny, dry car.

In one embodiment, the wash system 110 includes a split vertical chemical applicator 114a that will only apply chemical through the upper applicator 114ab when the vehicles height requires the activation of the applicator. In one embodiment, the upper side applicator 114ab will be off when the lower side applicator 114aa is active for the side under the hood, middle and trunk. In one embodiment, the upper side 114ab will be active on the side from the start of the front windshield to the end of the rear window. Additionally, in one embodiment, different volumes of wash solution can be applied through all 5 sets of applicators: top, driver and passenger lower side, and driver and passenger upper side applicators. In one embodiment, different volumes of wash solution can be applied to different parts of a vehicle, namely the front, the back, the upper side (i.e. passenger compartment above the hood/truck), and an overall greater volume for oversized vehicles. In one embodiment, front and back each consist of three chemical applicator manifolds. In one embodiment, chemical application is automated and controlled by the controller 122. In one embodiment, the controller 122 will determine when to turn on applicators, how much solution to apply (based on the speed of the vehicle) and if the chemical system is working correctly. Additionally, in one embodiment, the lower vertical side applicator 114*aa* pivots between 3 positions, spraying to the front of the vehicle, straight into the side and then pivoting again to spray the rear as the vehicle passes the applicator. Using one or more of total dissolved solids (TDS), PH, flow, and pressure transducers, optimal dilution ratios of the chemical may be enforced. In one embodiment, dilution rations are tied to the flow rate of the water going past the chemical injector pump. In one embodiment, a specific dilution, (e.g., 800:1) is maintained based on the flow rate. In one embodiment, assuming a vehicle 112 needs 0.5 gallons of lubricant, mixed 800:1 for the lower side of a vehicle. In such an embodiment, the vehicle 112 may pass through the application arch in 45 seconds. In another embodiment, at a higher conveyor speed the same vehicle 112 will only spend 30 seconds in the application arch. In one embodiment, the system 110 will vary the water pressure (and air if necessary) to ensure the same amount of product was applied to the vehicle 112. Physical limitations allow for moderate speed changes. If the conveyor speed is changed significantly, re-jetting the nozzles 114*d* in the arch may be required.

In one embodiment, flow sensors measure the incremental gallon per minute (GPM) necessary for each applicator as it is turned on. In one embodiment, if the volume is low, then a nozzle 118*d* is clogged. In one embodiment, if the flow rate is high, there is a leak. Real-time feedback and alerts are sent if the pressure, volume of solution or rate of injection of chemical show a deviation. Known car washes are based on the visual impact of the applicator to the site manager or technician. Application is not targeted on the vehicle.

In one embodiment, a single horizontal acidic foam applicator is applied to the vehicle 112. In one embodiment, the acid foam is a lubricant, necessary if there is any touch or friction applied to the vehicles surface, and also to neutralize the alkaline to aid in the drying process. In one embodiment, application of this lubricant will be repeated as necessary to keep the vehicle being washed, properly charged (acidic or alkaline) and lubricated. In one embodiment, with multiple applicator arches, the need for a computer controlled application system is essential. In one embodiment, targeted application improves quality and reduces cost, real-time feedback ensures repeatable quality and cost is managed. Space is also a problem with other chemical proportioning systems. Applying product in a more targeted manner may require 15-20 different applicators applying wash solutions to a vehicle. More accurate application of wash solutions in addition to more applicators require improved computer control to ensure quality and cost parameters are met.

In one embodiment, after a lubricant is applied, the vehicle 112 goes through a mitter which moves wash material over the horizontal surface of the vehicle. In one embodiment, the mitter provides agitation to the wash solutions and the vehicle surface preparing for the removal of the foreign matter from the vehicle. In one embodiment, the mitter also provides dwell time for the chemicals to fully react.

In one embodiment, high pressure water may be applied to the vehicle 112 to knock of any abrasive dirt before the wash process applies rotary friction to the cars surface. Sometimes the high pressure water applicators are staged in the wash process and sometimes the applicators are opposite each other. Mitters are usually in front of the high pressure application to control the water impacting the vehicles surface. Without the mitter blocking the water ricocheting off the vehicle, the drive-on area attendant, the person making sure vehicles get on the conveyor properly and the car is in neutral, would get very wet. In one embodiment, the pump system for the pressure application would also benefit from computer control to ensure that it is working correctly, no malfunctions and minimizing utility costs. In one embodiment, the computer 122 would control the RPM of the motor, and therefore the pump, through a variable frequency drive or similar device. In one embodiment, pressure and RPM are monitored to ensure the applicators are working optimally. In one embodiment, if a nozzle becomes clogged then the rpm would have to drop in order to maintain targeted water pressure. In one embodiment, if a leak occurs or the nozzles become worn, more RPMs would be required to maintain pressure. In one embodiment, either condition impacts wash performance and could be electronically relayed via email, text or alarm.

In one embodiment, vertical applicators apply a lubricant to the vehicle sides in advance of the brush or wrap 114*b*. In one embodiment, the brushes or wraps 114*b* clean the front, side and rear of the vehicle 112. In one embodiment, the brushes or wraps 114*b* are the most important piece of cleaning equipment but may cause the most damage and customer duress. Spinning the brushes or wraps 114*b* too slowly may cause the aluminum core holding the wash material to press into the car knocking off mirrors. Spinning the brushes or wraps 114*b* too quickly may pull off mirrors, antennas, trim and bumpers. Spinning the brushes or wraps 114*b* too quickly may also create a drum roll down the side of the vehicle 112 and cause great concern to the vehicles owner regarding the safety of the wash. The brushes or wraps 114*b* may run off the front of the vehicle and then swing back into the front corner panel, creating panic with the vehicle owner. Known car washes use a manually achieved balance of air pressure, washer rpm, mechanicals, lubricity and vehicle surface to control the brushes or wraps 114*b* to minimize the above problems. However, differently sized vehicles 112 make a single solution impossible and operators are continuously, manually adjusting the equipment to find the best average. In one embodiment, the wash system 110 controls the speed of the brush or wrap 114*b* based on the profile of the car being washed and the measured speed of the vehicle going through the wash. In one embodiment, the RPM of the brush or wrap 114*b* is determined by the speed of vehicle traveling through the wash and the length the washer needs to travel across the front of the vehicle 112. In one embodiment, positioning assist will also be provided to eliminate the reliance on just the mechanical balance between the washer and the vehicle.

In one embodiment, the primary arm of the brush or wrap 114*b* will be pushed via computer control to ensure the washer core stays the optimal distance from the surface of the vehicle 112. In one embodiment, the control of the brush or wrap 114*b* is closed loop that allows the computer system 122 to take appropriate action, including shutting down the wash, if the brush or wrap 114*b* makes an unexpected and/or dangerous movement. In one embodiment, the system 110 features a disengagement design requirement, if the brush or wrap 114*b* needs to move further away from the vehicle or the vehicle is not in the intended position, the position assist will not restrict washer movement away from the vehicle. In one embodiment, computer assist will only be used to prevent the brush or wrap 114b from coming in closer to the vehicles surface. In one embodiment, changing the RPM of the washer from the optimal speed to move across the front of the vehicle, to another speed down the side (positioned off the vehicle) and another speed on the rear of the vehicle will optimize cleaning performance, reduce damages and enhance the customer experience.

In one embodiment, grill washers (and other rotary wash equipment) would apply friction to the vehicles surface and require another application of a lubricant before the brush or wrap 114b applies friction to the vehicles surface. In one embodiment, the brush or wrap 114b would have the necessary position controls and disengagement to maintain optimal distance from the vehicle 112.

High pressure profiling arches have failed in the past due to sensor arrays being placed in the hostile wash environment. In one embodiment, the scanning arch 118 streams the vehicle profile to the pressure arch and eliminates the need for a significant array of sensors in the wash area. In one embodiment, the high pressure profiling arch would also utilize the same disengagement drive system. In one embodiment, computer control would move the arch away from the vehicle surface but the arch could always be safely moved further away mechanically if the vehicle was out of position or the control system failed. Past technology incorporated fixed drive systems or break away devices that altered the movement and cleaning of the device. The present system 110 allows for the equipment 114 to continue washing the vehicle 112 using mechanical methods if the computer assist fails or the vehicle is out of position. Significant damage would occur in previous designs if the device failed or the vehicle was out of position.

In one embodiment, polish or conditioner applications, to provide deeper cleaning, are applied in the manner previously described for repeatable results, monitoring and space savings. The placement of equipment, friction, high pressure and chemical, can vary by length of tunnel and the area of the country. The type of dirt varies across the country resulting in different equipment configurations. Seasonal variations require changes to conveyor speed, wash solution concentrations and volume of application but not changes to equipment placement.

In one embodiment, after the high pressure and friction portion of the wash is completed, rinsing and waxing is completed prior to drying. In one embodiment, based on the chemical process used, a rinse applicator may be necessary before applying waxes. Most chemical processes charge the vehicles surface so that the wax can be used as a rinse and the wax is pulled to the cars surface displacing the water. The water will bead and want to run off the car due to the layer of wax or polymers that have attached themselves to the painted surfaces. In one embodiment, the same high and low side applicators 114a targeting the various surfaces of the vehicle 112 would be used. In one embodiment, the real-time monitoring system 110 ensures repeatable quality. In one embodiment, chemical, water and sewer costs are significant reduced. Conversely, not enough lubricity may result in wet, dirty, dingy looking cars, impaired customer experiences and higher damage claims.

Blower technology varies greatly and a dirty car or a car that does not properly interact with the wax may not dry as efficiently and effectively as a clean car. The large number of manual adjustments within a wash system, based on observations and personal skill, make consistent quality nearly impossible. The most skilled individuals cannot adjust the equipment to work at higher conveyor speeds for both small cars and large trucks. As a result, cleaning is inconsistent (requiring expensive manual prep or washing before the car goes into the wash process), damages are high and customer experience is marginal. In at least some embodiments, the processes described above will ensure repeatable quality, reduce utility cost, reduce vehicle damages and create a better customer experience. In some embodiments, computer control and diagnostics will ensure the site attendant knows if something is not working correctly or the system 110 will shut down the wash if the condition warrants such an action. The chemical feed system and high pressure pump are examples of this. In one embodiment, if a wrap around arm moves in unexpected ways the CPU reading the encoder data will determine that the arm is significantly out of position and the wash can be shut down.

Figure 7:
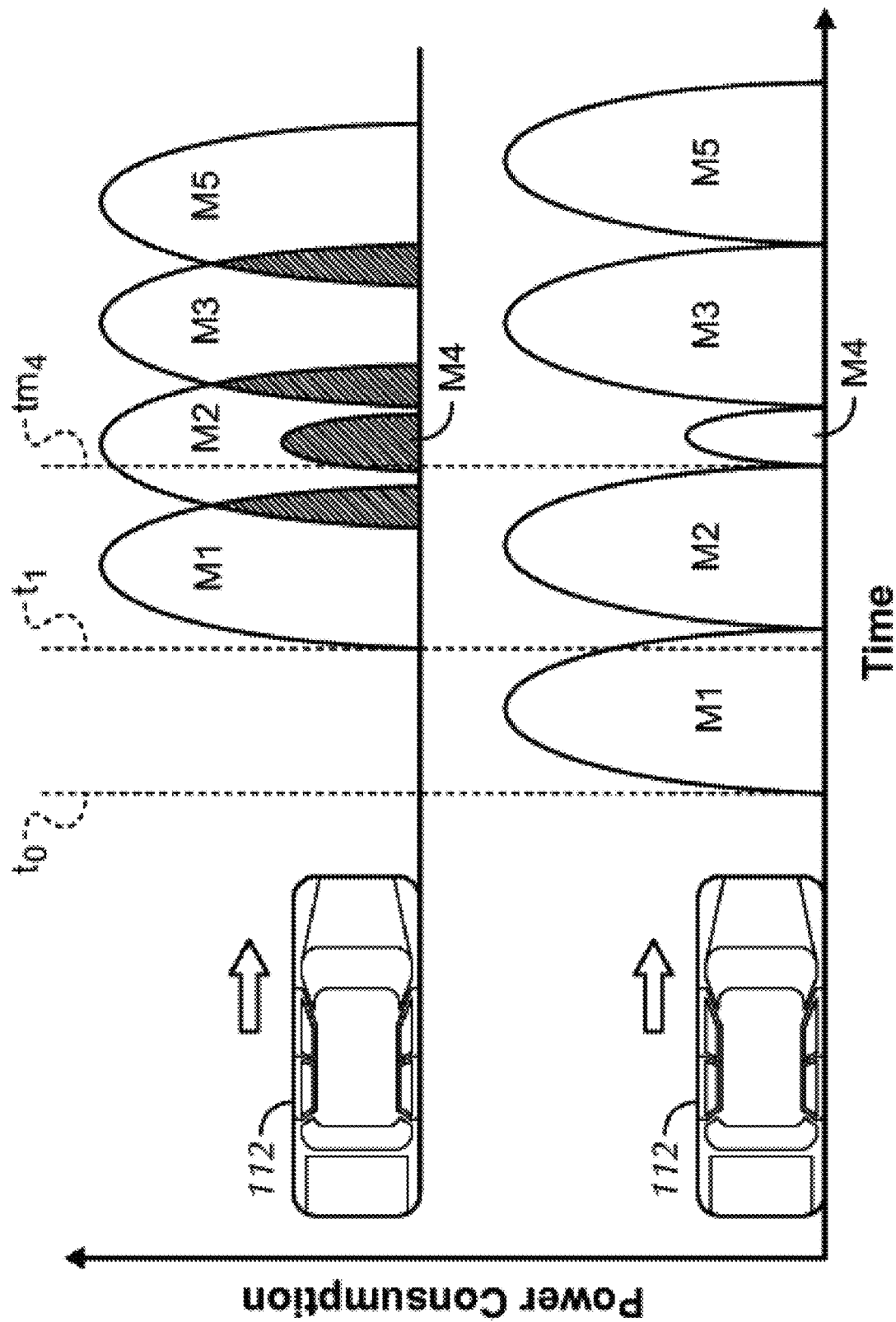
FIG. 7 illustrates an enhanced power management system in accordance with one or more embodiments of the present disclosure as compared to a conventional power management system.

Referring to FIG. 7, motor sequencing is the prioritizing of motor starters and can be an important requirement to cut energy cost. The upper section of FIG. 7 is a graphical representation of the motor starting sequence of five motors, M1, M2, M3, M4 and M5 of a conventional system and the lower section of FIG. 7 is an exemplary motor starting sequence of the present disclosure. Motor starting power levels are much higher than steady-state power requirements. Currently, the motor start process in the car wash tunnel is configured manually and is configured in such a way as to have significant overlap. If there are three motors with a six second ramp-up time, it is best to start them in a way that avoids an overlap in ramp-up time. This can be accomplished if the control system calculates the conversion time for motor inrush time into conveyor travel for the current conveyor speed and sets the appropriate motor start times.

In one embodiment, staggering the motors used in the system 110 may save additional energy in addition to or separate from the energy savings as a result implementing the embodiments described above. In one embodiment, staggering the motors M1 to M5 is accomplished by assigning a priority level to each application that uses power from the motors M1 to M5. In one embodiment, motors M1 to M5 can be staggered started based on 4 priority levels. For example, Level 1 is the highest priority reserved for pumps that are time critical in the wash process but also consume water and sewer (e.g., M4), Level 2 is for motors that are time critical in the wash process, Level 3 motors are off line motors on the site such as vacuums, Level 4 motors are off line motors that do not have to start immediately, such as an air compressor. In one embodiment, M4 is activated at time $t_{m4}$. In one embodiment, Level 2 is time critical and must be activated on time (e.g., M1 and M2). In one embodiment, M1 is activated at time to. Time ti is the time M1 would have otherwise been activated. In one embodiment, Level 3 has a less critical start time like a vacuum motor (e.g., M3). Level 4, in this example, is not time critical such as an air compressor motor (e.g., M5). If a series of Level 2 motors will be starting and conflict with a Level 1 start requirement, the Level 2 motors will start early and leave the appropriate time interval for the Level 1 motor to start. Level 2 motors will resume after the Level 1 is started. If a Level 3 start request is received during a Level 1 or 2 startup, it may be delayed until the higher priority motors have finished starting. Level 4 start requests will wait until Level 1, 2 and 3 requests are satisfied since their start times are the least time critical. This feature will ensure that no two motors start at the same time on the site, keeping inrush or electric demand low.

In one embodiment, if the conveyor speed is changed to wash more vehicles 112, then the inrush times of several components, and their motors M1-M5, may overlap, producing an increase in peak power consumption and demand. This may have two (2) negative effects: 1) higher utility rates, which are often tied to peak demand rather than average usage; and/or 2) the need to add electrical capacity to meet peak loads rather than average demand. The motors start time based on conveyor movement is adjusted to take into account the fixed time interval for startup or inrush.

In one embodiment, a feedback control system with a single amp probe, which may be used in conjunction with optional single device probes, may be used to verify startup time and determine if a motor is starting slower or is under increased load. In some embodiments, start-up timing of individual motors M1-M5 is modified in such a way as to smooth total power demand and provide: Minimum peak demand for the lowest utility rate classification; Avoidance of peak electrical demands that may exceed the existing power supply, and produce power interruptions; avoidance of multiple amp probes to monitor power demand for each motor M1-M5; and/or avoidance of unnecessary capital investment for electrical capacity to address peak power demand issues.

In one embodiment, a multi-point motor controller is used with the ability to set priority bands for each piece of equipment; e.g., priority 1 to 4 levels which will determine which equipment 114 (e.g., motors M1-M5) is given priority when an unavoidable overlap in motor start-up would otherwise occur. In one embodiment, a single amp probe is used to measure total electrical demand. Optional probes may be utilized on loads that may vary over time. In one embodiment, feedback control of motor start timing is based upon priority demands and avoidance of inrush time overlap.

Operation example: The following 5 motor driven devices are to be controlled to avoid inrush overlap. In one embodiment, the start time is determined based on the distance from the entry gate switch. For example, Table 2 illustrates sample values for the 5 motors:

TABLE 2

| Motor #-Output Name | Inrush time in seconds | Priority | Start Position |
| --- | --- | --- | --- |
| 1-Pressure Pump | 7 | 1 | 120 |
| 2-Blower | 6 | 2 | 1100 |
| 3-Vacuum | 10 | 3 | |
| 4-Air Compressor | 4 | 4 | |
| 5-Blower | 6 | 2 | 950 |

The system 110 may have extra fields to be configured in the relays configuration page. In one embodiment, the extra fields include inrush time in seconds and when the motor needs to be running for a vehicle to be properly washed. Inrush time is the time taken by the equipment to ramp up, start priority defines the importance of a single component in the tunnel relative to others and start time tells the system when it must be on by.

The system 110 may ramp up components before the car approaches the start point of that component. In one embodiment, the system 110 will not permit overlapped start times for the inrush required components. In one embodiment, if there are devices with start priority 1, then devices with start priority 2 have to be started ahead of start priority 1. The start priority is the start times for the devices in the tunnel. In some embodiments, the start priority 1 devices M4 are chemicals and liquids which can not be wasted, so they are always started at their exact start position. In one embodiment, start priority 3s can not be turned on until all the start priority 1 and 2s are done. In one embodiment, if there is a gap between start priorities 1 & 2 and it is more than the inrush time of start priority 3 or 4, then start priorities 3 & 4 can be started. In one embodiment, if start priority 4 has less inrush time than 3 and inrush time of start priorities 1 & 2 has a gap more than inrush of 4, then start priority 4 can be started.

In one embodiment, motors M3, M5 having start priority 3 & 4 shall be configurable from the relays output page. The output type may always be External or off line for such devices. In some embodiments, the same devices shall be able to assign to any of the auxiliary inputs.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

In the above detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A wash equipment assembly for a car wash for washing a vehicle, the wash equipment assembly comprising:
    a wash equipment element configured to clean a vehicle, wherein the wash equipment element is movable with respect to the vehicle;
    an actuator coupled to the wash equipment element, the actuator configured to move the wash equipment element;
    a sensor configured to determine an orientation of the wash equipment element; and
    a controller coupled to the sensor and the actuator, the controller configured to:
        control the actuator to move the wash equipment element to a vehicle cleaning position based on an expected position of the vehicle,
        determine, via the sensor, whether the orientation of the wash equipment element differs relative to an expected orientation of the wash equipment element to clean the vehicle,
        modify, throughout a course of washing the vehicle, the vehicle cleaning position for the wash equipment element based on the determination whether the orientation of the wash equipment element differs relative to the expected orientation, and
        determine, based on the whether the orientation of the wash equipment element differs relative to the expected orientation throughout the course of washing the vehicle, whether the washing of the vehicle was adequate.

2. The wash equipment assembly of claim 1, wherein the controller is further configured to:
    provide an alert according to the determination as to whether the washing of the vehicle was adequate.

3. The wash equipment assembly of claim 1, wherein the sensor is configured to determine an angle relative to a vertical axis of the wash equipment element.

4. The wash equipment assembly of claim 1, wherein the wash equipment element is selected from the group consisting of a soap sprayer, a chemical sprayer, a brush, a wrap, and a dryer.

5. The wash equipment assembly of claim 1, wherein the controller is further configured to:

stop the wash equipment assembly according to whether the orientation of the wash equipment element differs relative to the expected orientation by at least a threshold value.

6. The wash equipment assembly of claim 1, wherein the controller is configured to:
set a minimum distance between the wash equipment element and the vehicle;
control the actuator according to the minimum distance; and
modify the minimum distance in order to modify the vehicle cleaning position for the wash equipment element.

7. A car wash system for washing a vehicle, the car wash system comprising:
a wash tunnel along which the vehicle is guided;
a wash equipment element positioned with respect to the wash tunnel such that the wash equipment element is configured to clean a vehicle, wherein the wash equipment element is movable with respect to the vehicle;
an actuator coupled to the wash equipment element, the actuator configured to move the wash equipment element;
a sensor configured to determine an orientation of the wash equipment element; and
a controller coupled to the sensor and the actuator, the controller configured to:
control the actuator to move the wash equipment element to a vehicle cleaning position based on an expected position of the vehicle,
determine, via the sensor, whether the orientation of the wash equipment element differs relative to an expected orientation of the wash equipment element to clean the vehicle,
modify, throughout a course of washing the vehicle, the vehicle cleaning position for the wash equipment element based on the determination whether the orientation of the wash equipment element differs relative to the expected orientation, and
determine, based on the whether the orientation of the wash equipment element differs relative to the expected orientation throughout the course of washing the vehicle, whether the washing of the vehicle was adequate.

8. The car wash system of claim 7, further comprising:
a vehicle movement device configured to move the vehicle through the car wash tunnel.

9. The car wash system of claim 8, wherein the vehicle movement device comprises a conveyor.

10. The car wash system of claim 8, wherein the expected position of the vehicle is determined based on the vehicle movement device.

11. The car wash system of claim 7, wherein the controller is further configured to:
provide an alert according to the determination as to whether the washing of the vehicle was adequate.

12. The car wash system of claim 7, wherein the sensor is configured to determine an angle relative to a vertical axis of the wash equipment element.

13. The car wash system of claim 7, wherein the wash equipment element is selected from the group consisting of a soap sprayer, a chemical sprayer, a brush, a wrap, and a dryer.

14. The car wash system of claim 7, wherein the controller is further configured to:
stop the wash equipment assembly according to whether the orientation of the wash equipment element differs relative to the expected orientation by at least a threshold value.

15. The car wash system of claim 7, wherein the controller is configured to:
set a minimum distance between the wash equipment element and the vehicle;
control the actuator according to the minimum distance; and
modify the minimum distance in order to modify the vehicle cleaning position for the wash equipment element.

* * * * *